US011407537B2

(12) United States Patent
Chevalier et al.

(10) Patent No.: US 11,407,537 B2
(45) Date of Patent: Aug. 9, 2022

(54) APPARATUS AND METHOD FOR VACUUM SKIN PACKAGING OF A PRODUCT AND A SKIN PACKAGED PRODUCT

(71) Applicant: Cryovac, LLC, Charlotte, NC (US)

(72) Inventors: Christophe Chevalier, Chartainvilliers (FR); Antonio Liperoti, Origgio (IT); Iacopo Tibe', Cantù (IT)

(73) Assignee: Cryovac, LLC, Charlotte, NC (US)

( * ) Notice: Subject to any disclaimer, the term of this patent is extended or adjusted under 35 U.S.C. 154(b) by 11 days.

(21) Appl. No.: 17/266,191

(22) PCT Filed: Aug. 7, 2019

(86) PCT No.: PCT/EP2019/071267
§ 371 (c)(1),
(2) Date: Feb. 5, 2021

(87) PCT Pub. No.: WO2020/030717
PCT Pub. Date: Feb. 13, 2020

(65) Prior Publication Data
US 2021/0292019 A1    Sep. 23, 2021

(30) Foreign Application Priority Data

Aug. 8, 2018 (EP) .................................... 18188044

(51) Int. Cl.
*B65B 11/52* (2006.01)
*B65B 7/16* (2006.01)
(Continued)

(52) U.S. Cl.
CPC .............. *B65B 11/52* (2013.01); *B65B 7/164* (2013.01); *B65B 43/52* (2013.01); *B65B 43/54* (2013.01); *B65B 51/14* (2013.01); *B65B 57/00* (2013.01)

(58) Field of Classification Search
CPC ............................... B65B 7/164; B65B 11/52
(Continued)

(56) References Cited

U.S. PATENT DOCUMENTS 2,912,805 A * 11/1959 Maynard, Jr. ........... B65B 11/52
53/427
2,958,172 A * 11/1960 La Branche ............ B65B 11/52
53/509
(Continued)

FOREIGN PATENT DOCUMENTS

CN      1156110 A    8/1997
CN      1367120 A    9/2002
(Continued)

*Primary Examiner* — Stephen F. Gerrity
(74) *Attorney, Agent, or Firm* — Jon M. Isaacson

(57) ABSTRACT

A product can be packaged by arranging the product on a support, providing a plastic film above the support with the product arranged between the support and the film sheet, and air tightly fixing the film to the support. The process can be implemented using an apparatus that includes a film supply assembly and a base equipment having an upper side defining one or more receiving areas, each being configured for receiving a respective product loaded support; an upper tool is configured for holding a film portion above the product loaded support and then heat sealing the film portion to the product loaded support. Each receiving area has a flat portion and elongated features protruding above the plane of flat portion.

23 Claims, 12 Drawing Sheets

(51) Int. Cl.
*B65B 43/52* (2006.01)
*B65B 43/54* (2006.01)
*B65B 51/14* (2006.01)
*B65B 57/00* (2006.01)

(58) Field of Classification Search
USPC .................................................. 53/427, 509
See application file for complete search history.

(56) References Cited

U.S. PATENT DOCUMENTS

| | | | |
|---|---|---|---|
| 3,279,144 A * | 10/1966 | Larson | B65B 11/52 53/427 |
| 3,299,608 A | 1/1967 | Orloff et al. | |
| 3,410,699 A * | 11/1968 | Peters | B65D 75/327 53/427 |
| 3,828,520 A | 8/1974 | Merritt | |
| 3,830,365 A | 8/1974 | Krueger et al. | |
| 4,375,851 A | 3/1983 | Paulos | |
| 4,537,011 A * | 8/1985 | Bortolani et al. | B65B 11/52 53/427 |
| 4,915,231 A | 4/1990 | Perbet et al. | |
| 2005/0166501 A1 | 8/2005 | Navas et al. | |
| 2010/0115890 A1 | 5/2010 | Granili | |
| 2012/0099806 A1 | 4/2012 | Turvey et al. | |
| 2014/0322396 A1 | 10/2014 | Walker | |
| 2017/0029146 A1 | 2/2017 | Palumbo et al. | |
| 2017/0088297 A1 | 3/2017 | Barton | |

FOREIGN PATENT DOCUMENTS

| | | |
|---|---|---|
| CN | 101918191 A | 12/2010 |
| CN | 105209341 A | 12/2015 |
| CN | 107554852 A | 1/2018 |
| DE | 2412948 A1 | 10/1975 |
| EP | 0092626 A1 | 11/1983 |
| EP | 2248737 A1 | 11/2010 |
| ES | 2006808 A6 | 5/1989 |
| TW | M290138 U | 5/2006 |

* cited by examiner

APPARATUS AND METHOD FOR VACUUM SKIN PACKAGING OF A PRODUCT AND A SKIN PACKAGED PRODUCT

TECHNICAL FIELD

The present invention generally relates to an apparatus and to a method for packaging of a product. In an aspect, the present invention relates to an apparatus and to a method for vacuum skin packaging of a product. The invention also relates to a skin packaged product. In particular, the invention relates to a skin packaged product obtainable with said vacuum skin packaging apparatus or method.

BACKGROUND ART

Packaging of products entails the application of a plastic film sealed above a product loaded support. In particular, vacuum skin packaging is a process used for packaging a wide variety of products, in particular perishable goods like food products such as fresh or frozen meat, fresh or frozen fish, cheese, processed meat, ready meals, etcetera. In a vacuum skin packaging process, a product is placed on a support (for example a flat tray or a tray with sidewall) and then the support with the product placed thereon is put in a vacuum chamber, where a film of plastic material is a applied to the product loaded support. In greater detail, the vacuum chamber comprises a top tool which is designed to hold the plastic film in a position above the product loaded support using vacuum means. The top tool is also designed to heat and soften the plastic film which therefor acquires the necessary deformability and stickiness. While the plastic film is held by vacuum at a distance above the product loaded support, the volume between the support and the film is evacuated from air. Then a step of re-venting takes place, wherein the vacuum holding the thermoplastic film is released to cause the film to drape down all around the product and seal to the surface of the support not covered by the product, thus forming a tight skin around the product and on the support.

Due to cost reasons and with the aim of reducing as possible any waste material, the supports used in the above described packaging processes have a reduced wall thickness. On the other hand, supports may be flat or substantially flat or at least include a flat or substantially flat major portion onto which the product is positioned. Thus, the entire support or at least a major portion of it presents little ability to resist to deformations directed out of the plane of the flat support or of the flat portion of the support. These circumstances may play a negative role because, after application of the plastic film to the support, the heated plastic film cools down and contracts in a manner and to an extent typically different from the underlying support causing formation of bends or undulations in the support. It is evident that an undulated support or a support with bent portions heavily compromises the aesthetics of the packaged product, renders the packaged product very difficult to stack even when the product has a laminar conformation, and in extreme cases may also compromise the reliability of the sealed connection between the plastic film and the underlying support.

It is therefore an object of the present invention to provide an apparatus and a method capable of adequately solving the problems underlined above.

In particular, it is an object of the invention offering a packaging method and apparatus capable of reducing or avoiding out of plane deformations in the support underlying the product during or after the packaging cycle, such that undulations or bends in the support of the packaged product are minimized Additionally, it is an object of the invention providing an apparatus and a process solving the above identified problems without impairing in term of overall packaging costs and thus without requiring use of thicker supports.

Furthermore, it is an object providing a method and an apparatus which may be implemented with no need of complex changes to conventional packaging systems and without impairing on the phases or duration of the packaging process.

A further auxiliary object is an apparatus and a method capable of solving the above identified problems and thus improving the aesthetics of the final packaged product.

SUMMARY

At least one of the above objects is substantially reached by an apparatus and by a method according to one or more of the appended claims.

Apparatus and processes according to aspects of the invention and capable of achieving one or more of the above objects are here below described.

A 1st aspect concerns an apparatus for packaging a product arranged on a support (2) comprising:
- a film supply assembly (3) configured for supplying a plastic film (4);
- a base equipment (6) having an upper side (7) defining one or more receiving areas (8), each receiving area being configured for receiving at least one respective product loaded support (2);
- an upper tool (10) operative above the base equipment (6) and configured for holding a film portion (4a) of said plastic film (4) above the at least one product loaded support (2) positioned in the respective receiving area, the upper tool (10) and the base equipment (6) being configured to cooperate for heat sealing the film portion (4a) to said at least one product loaded support (2).

In a 2nd aspect according to the 1st aspect each receiving area (8) comprises a flat portion (80) extending on a predetermined positioning plane (81) and defining a majority of the surface of the receiving area (8), and one or more elongated features (82) protruding above the positioning plane of the flat portion (80).

In a 3rd aspect according to the preceding aspect each one of the elongated features (82) in each receiving area (8) protrudes above the positioning plane (81) to define a feature height (h) above the same positioning plane (81) comprised between 0.1 and 2.0 mm.

In a 4th aspect according to the 2nd or to the 3rd aspect each receiving area (8) has at least 75% of the surface which is flat, with the elongated features being narrow and elongated and representing the sole discontinuity from planarity of the receiving area.

In a 5th aspect according to the preceding aspect each receiving area (8) has at least 85% of the surface which is flat, with the elongated features being narrow and elongated and representing the sole discontinuity from planarity of the receiving area.

In a 6th aspect according to the preceding aspect each receiving area (8) has at least 95% of the surface which is flat, with the elongated features being narrow and elongated and representing the sole discontinuity from planarity of the receiving area.

In a 7th aspect according to any one of aspects from 2nd to 6th each one of the elongated features (82) has a length measured along the elongated feature and parallel to the positioning plane (81), which is at least 10 times the width of the same elongated feature.

In a 8th aspect according to any one of aspects from 2nd to 7th each one of the receiving areas (8) is in the form of a rectangle.

In a 9th aspect according to the preceding aspect each one of the elongated features (82) is in the form of a continuous rib extending across the respective receiving area and having a length which is at least 75%, optionally at least 90%, the length of the longest side of said rectangle.

In a 10th aspect according to the preceding aspect each one of the elongated features (82) is in the form of a continuous and straight rib extending across the respective receiving area and having a length which is at least 75%, optionally at least 90%, the length of the longest side of said rectangle.

In a 11th aspect according to any one of aspects from 2nd to 7th each one of the receiving areas is in the form of a circle.

In a 12th aspect according to the preceding aspect each one of the elongated features (82) is in the form of a continuous rib extending across the respective receiving area and having a length which is at least 75%, optionally at least 90%, the length of the circle diameter.

In a 13th aspect according to the preceding aspect each one of the receiving areas is in the form of a circle and each one of the elongated features (82) is in the form of a continuous and straight rib extending across the respective receiving area and having a length which is at least 75%, optionally 90%, the length of the circle diameter.

In a 14th aspect according to any one of aspects from the 2nd to the 13th the one or more elongated features (82) are symmetrically positioned with respect to a longitudinal axis of symmetry of the receiving area.

In a 15th aspect according to the preceding aspect, wherein each receiving area is in the form of a rectangle and the one or more elongated features (82) are symmetrically positioned with respect to a longitudinal axis of symmetry extending parallel to the two long sides of the rectangle and passing through the center of the rectangle.

In a 16th aspect according to any one of aspects from the 2nd to the 15th each one of the elongated features (82) is defined by a respective elongated element removably engaged to the upper side of the base equipment (6).

In a 17th aspect according to any one of aspects from the 2nd to the 16th said elongated features (82) comprise one or more first elongated features (83) extending along a first direction, and one or more second elongated features (84) extending along a second direction at an angle to the first direction.

In an 18th aspect according to the preceding aspect said elongated features further include third elongated features (85) extending transversally to both said first and said second elongated features.

In a 19th aspect according to any one of aspects from the 2nd to the 18th the elongated features (82) comprise portions extending in correspondence of a peripheral band which encircles a central zone of the respective receiving area.

In a 20th aspect according to the preceding aspect the elongated features (82) include at least one annular feature extending along said peripheral band.

In a 21st aspect according to any one of aspects from the 2nd to the 20th each one of the elongated features (82) presents, in cross section, a rounded top contour.

In a 22nd aspect according to any one of the preceding aspects the base equipment (6) comprises a lower tool (11) cooperating with the upper tool (10) in correspondence of a packaging station (5) of the apparatus, and wherein the upper tool (10) and the lower tool (11) are relatively displaceable between:
- a first operating condition, where the upper tool (10) is sufficiently spaced from the lower tool (11) to allow positioning of one or more of said product loaded supports (2) below said film portion (4a) held by the upper tool (10), and
- a second operating condition, where the upper tool (10) is approached relative to the lower tool (11) and is configured to heat seal the at least one film portion (4a) to the at least one underlying product loaded support (2).

In a 23rd aspect according to the preceding aspect the apparatus includes a vacuum arrangement (13) configured for removing air at least from a volume between said at least one film portion (4a) and the one or more product loaded supports (2) located in the packaging station (5).

In a 24th aspect according to the preceding aspect the apparatus further includes suction apertures (18) distributed on an active surface (17) of the upper tool (10) and connected with said vacuum arrangement (13) or with an auxiliary vacuum arrangement (22).

In a 25th aspect according to the 23rd or to the 24th aspect the apparatus additionally includes a heater (21) configured to heat at least a portion of the upper tool active surface (17).

In a 26th aspect according to the preceding aspect, the apparatus further includes a control unit (100) configured for controlling the upper and lower tools (10, 11), the heater, the vacuum arrangement and optionally the auxiliary vacuum arrangement.

In a 27th aspect according to the preceding aspect, the control unit (100) is configured to execute the following cycle:
- causing the upper and lower tools (10, 11) to position in the first operating condition,
- with the upper and lower tools (10, 11) in the first operating condition,
  - commanding one of the vacuum arrangement (13) or the auxiliary vacuum arrangement (22) to cause suction of gas through said suction apertures (18) and hold the film portion (4a) against or close to said active surface (17),
  - commanding the heater (21) to cause heating of at least part of the film portion (4a) held by the upper tool (10),
- causing the upper and lower tools (10, 11) to move to the second operating condition,
- with the upper and lower tools (10, 11) in the second operating condition,
  - commanding the vacuum arrangement (13) to extract gas present between the at least one film portion (4a) and the underlying product loaded support (2),
  - commanding one of the vacuum arrangement (13) or the auxiliary vacuum arrangement (22) to cause re-venting with expulsion of gas through the suction apertures to release the film portion (4a) from the upper tool (10) active surface and drape down of the film portion (4a) onto the product loaded support (2), the film portion (4a) heat sealing to an upper surface of the support (2) not covered by the product forming at least one vacuum skin packaged product.

In a 28th aspect according to the 22nd aspect the apparatus includes a conveyor (12) configured for displacing one or more product loaded supports (2) along a predetermined path at least from a product loading station (9) to said packaging station (5).

In a 29th aspect according to the preceding aspect the apparatus additionally includes a vacuum arrangement (13) configured for removing air at least from a volume between said at least one film portion (4*a*) and the one or more product loaded supports (2) located in the packaging station (5).

In a 30th aspect according to the preceding aspect the apparatus additionally comprises suction apertures (18) distributed on an active surface (17) of the upper tool (10) and connected with said vacuum arrangement (13) or with an auxiliary vacuum arrangement (22).

In a 31st aspect according to any one of the preceding three aspects the apparatus additionally includes a heater (21) configured to heat at least a portion of the upper tool active surface (17).

In a 32nd aspect according to the preceding aspect the apparatus additionally comprises a control unit (100) configured for controlling the conveyor (12), the upper and lower tools (10, 11), the heater, the vacuum arrangement and optionally the auxiliary vacuum arrangement.

In a 33rd aspect according to the preceding aspect the control unit (100) is configured to execute the following cycle:
  causing the upper and lower tools (10, 11) to position in the first operating condition,
  with the upper and lower tools (10, 11) in the first operating condition,
    commanding one of the vacuum arrangement (13) or the auxiliary vacuum arrangement (22) to cause suction of gas through said suction apertures (18) and hold the film portion (4*a*) against or close to said active surface (17),
    commanding the heater to cause heating of at least part of the film portion (4*a*) held by the upper tool (10),
    causing the conveyor (12) to position one or more of said product loaded supports (2) on the respective receiving area (8) of the base equipment (6), below said film portion (4*a*) held by the upper tool (10),
  causing the upper and lower tools (10, 11) to move to the second operating condition,
  with the upper and lower tools (10, 11) in the second operating condition,
    commanding the vacuum arrangement (13) to extract gas present between the at least one film portion (4*a*) and the underlying product loaded support (2),
    commanding one of the vacuum arrangement (13) or the auxiliary vacuum arrangement (22) to cause re-venting with expulsion of gas through the suction apertures (18) to release the film portion (4*a*) from the upper tool (10) active surface and drape down of the film portion (4*a*) onto the product loaded support (2), the film portion (4*a*) heat sealing to an upper surface of the support (2) not covered by the product forming at least one vacuum skin packaged product.

In a 34th aspect according to any one of aspects from 22nd to 27th the receiving areas (8) are defined on an upper side of the lower tool (11) which is directly facing the upper tool (10).

In a 35th aspect according any one of aspects from 28th to 33th said receiving areas (8) are defined on an upper side of the conveyor (12) which is configured to cross the packaging station (5) above the lower tool (11).

A 36th aspects concerns a process of packaging a product arranged on a support (2) using the apparatus according to any one of the preceding claims.

A 37th aspect according to the preceding aspect concerns a process of packaging, wherein the process comprises the following steps:
  supplying a plastic film (4) from the film supply assembly (3);
  placing at least one product loaded support (2) on the respective receiving area (8) of the base equipment (6);
  holding a film portion (4*a*) of said plastic film (4) above the at least one support (2) loaded product positioned in the respective receiving area (8);
  heat sealing the at least one film portion (4*a*) of said plastic film (4) to the at least one respective of said product loaded supports (2).

A 38th aspect concerns a process of packaging a product arranged on a support (2) using the apparatus of any one of aspects from the 22nd to the 35th, wherein the packaging process comprises the following steps:
  positioning the upper and lower tools (10, 11) in the first operating condition;
  with the upper and lower tools (10, 11) in the first operating condition,
    sucking gas through said suction apertures (18) and hold the film portion (4*a*) against or close to said active surface (17),
    heating at least part of the film portion (4*a*) held by the upper tool (10),
    placing at least one product loaded support (2) located on the respective receiving area (8) of the base equipment (6) below said film portion (4*a*) held by the upper tool (10),
  moving the upper and lower tools (10, 11) to the second operating condition;
  with the upper and lower tools (10, 11) in the second operating condition,
    extracting gas present between the at least one film portion (4*a*) and the underlying product loaded support (2),
    re-venting of gas through the suction apertures (18) and releasing the film portion (4*a*), allowing the film portion (4*a*) to drape down and heat seal to the product loaded support (2) forming at least one vacuum skin packaged product (P).

In a 39th aspect according to the preceding aspect during said step of re-venting, the one or more supports (2) are pressed against the respective receiving area causing formation on the top surface of support (2) of elongated ridges (93) and on the bottom surface of support (2) of corresponding elongated indents (94), the elongated ridges and underlying elongated indents being counter-shaped to the elongated features (82) present on the receiving area.

In a 40th aspect according to any one of aspects from the 36th to the 39th each one of the one or more supports (2) presents:
  a sheet body having a top surface, a bottom surface and a thickness, one or more preformed elongated ridges protruding from top surface, and one or more preformed elongated indents on the bottom surface extending along and in correspondence of the elongated ridges.

In a 41st aspect according to the preceding aspect the top and bottom surfaces of the sheet body, with the exclusion of said elongated ridges and of said elongated indents, are flat and extend along respective parallel top and bottom planes.

In a 42nd aspect according to any one of the preceding two aspects the preformed elongated indents of each support (2) position above and engage corresponding elongated features (82) present on the respective receiving area defined in the base equipment (6).

In a 43rd aspect according to any one of the preceding three aspects each one of the elongated ridges protrudes above said top plane to define a ridge height comprised between 0.1 and 2.0 mm.

In a 44th aspect according to any one of the preceding four aspects wherein each one of the elongated ridges presents, in cross section, a rounded top contour.

In a 45th aspect according to any one of aspects from the 36th to the 44th the plastic film heat sealed to the product loaded support (2) and the product loaded support (2) are made from respective different materials.

In a 46th aspect according to any one of aspects from the 36th to the 45th, at atmospheric pressure and at least in an interval between 20° C. and 100° C., the plastic film has a coefficient of linear expansion per Celsius degree in at least one direction which is greater than the coefficient of linear expansion per Celsius degree in the same direction of the underlying support (2).

In a 47th aspect according to any one of aspects from the 36th to the 46th, the support (2) presents a thickness comprised between 0.10 mm and 2.00 mm.

In a 48th aspect according to any one of aspects from the 36th to the 47th, the support (2) is formed by one of the following:
 a sheet of paper,
 a sheet of cardboard,
 a multilayered structure comprising at least one layer of paper and at least one layer of cardboard,
 a multilayered structure comprising a plurality of layers of paper,
 a multilayered structure comprising a plurality of layers of cardboard,
 a plastic sheet,
 a multilayered structure comprising a plurality of layers of plastic,
 a multilayered structure comprising at least one continuous inner layer of paper sandwiched between at least one continuous top liner of plastic and at least one continuous bottom liner of plastic,
 a multilayered structure comprising at least one continuous inner layer of cardboard sandwiched between at least one continuous top liner of plastic and at least one continuous bottom liner of plastic.

In a 49th aspect according to any one of aspects from the 36th to the 48th, the plastic film presents a thickness comprised between 20 microns and 200 microns.

In a 50th aspect according to any one of the preceding aspects, the plastic film presents a free shrink at 160° C., in both the longitudinal and transversal directions (ASTM D2732), which is greater than 3% and less than 20%.

In a 51st aspect according to any one of the preceding aspects, the plastic film presents a free shrink at 160° C., in both the longitudinal and transversal directions (ASTM D2732), which is greater than 3% and less than 15%.

In a 52nd aspect according to any one of the preceding aspects, the plastic film presents a free shrink at 160° C., in both the longitudinal and transversal directions (ASTM D2732), which is greater than 3% and less than 10%.

In a 53rd aspect according to any one of the preceding aspects, the plastic film presents a residual shrink tension at 5° C., in both the longitudinal and transversal directions, which is at least 3 times greater than the residual shrink tension at 100° C. Note the residual shrink tension is determined with the procedure disclosed in the detailed description.

In a 54th aspect according to any one of the preceding aspects, the plastic film presents a residual shrink tension at 5° C., in both the longitudinal and transversal directions, which is at least 5 times greater than the residual shrink tension at 100° C. Note the residual shrink tension is determined with the procedure disclosed in the detailed description.

In a 55th aspect according to any one of aspects from the 36th to the 54th each one of said one or more supports (2) presents through holes and during gas extraction at least part of extracted gas passes through one or more through holes present in the support (2).

In a 56th aspect according to any one of aspects from the 36th to the 55th, using the apparatus of the 35th aspect, each one of said one or more supports (2) presents through holes and the conveyor comprises a conveyor belt having gas passages and/or porous portions, wherein during gas extraction extracted gas passes through one or more through holes present in the support (2) and through one or more passages or gas permeable portions of the conveyor belt.

A 57th concerns a vacuum skin package comprising:
 a product loaded support (2),
 a plastic film portion (4a) heat sealed to a top surface of the product loaded support (2) not covered by the product,
wherein the support (2) presents:
 a sheet body having a top surface (90), a bottom surface (91) and a thickness (92), one or more elongated ridges (93) protruding from top surface (90), and one or more elongated indents (94) on the bottom surface (91) extending along and in correspondence of the elongated ridges (93).

In a 58th aspect according to the preceding aspect the top and bottom surfaces (90, 91) of the sheet body, with the exclusion of said elongated ridges and of said elongated indents, are flat and extend along respective parallel top and bottom planes (95, 96).

In a 59th aspect according to any one of the preceding two aspects each one of the elongated ridges (93) protrudes above said top plane to define a ridge height (h') comprised between 0.1 and 2.0 mm.

In a 60th aspect according to any one of the preceding three aspects each one of the elongated ridges presents, in cross section, a rounded top contour.

In a 61st aspect according to any one of the preceding four aspects each one of the elongated ridges (93) has a length measured along the elongated ridge (93) and parallel to the top plane (95), which is at least 10 times a width of the same elongated ridge.

In a 62nd aspect according to any one of the preceding five aspects the elongated ridges (93) and the corresponding elongated indents (94) comprise first elongated ridges and corresponding first elongated indents extending at across the support (2) along a first direction, and second elongated ridges and corresponding second elongated indents extending at across the support (2) along a second direction, which is transverse, optionally perpendicular, to the first direction.

In a 63rd aspect according to any one of the preceding six aspects the support (2) is rectangular and each one of the elongated ridges (93) is in the form of a continuous rib extending across the support and having a length which is at least 75% the length of the longest side of said support.

In a 64th aspect according to any one of the preceding seven aspects the support (2) is rectangular and each one of the elongated ridges (93) is in the form of a continuous and straight rib extending across the support and having a length which is at least 75% the length of the longest side of said support.

In a 65rd aspect according to any one of the preceding eight aspects the support (2) is rectangular and each one of the elongated ridges (93) is in the form of a continuous rib extending across the support and having a length which is at least 90% the length of the longest side of said support.

In a 66th aspect according to any one of the preceding nine aspects the support (2) is rectangular and each one of the elongated ridges (93) is in the form of a continuous and straight rib extending across the support and having a length which is at least 90% the length of the longest side of said support.

In a 67th aspect according to any one of the aspects from the 57th to the 62nd the support (2) is circular and each one of the elongated ridges (93) is in the form of a continuous rib extending across the support and having a length which is at least 75% the length of the support diameter.

In a 68th aspect according to any one of the aspects from the 57th to the 62nd the support (2) is circular and each one of the elongated ridges (93) is in the form of a continuous and straight rib extending across the support and having a length which is at least 75% the length of the support diameter.

In a 69th aspect according to any one of the aspects from the 57th to the 62nd the support (2) is circular and each one of the elongated ridges (93) is in the form of a continuous rib extending across the support and having a length which is at least 90% the length of the support diameter.

In a 70th aspect according to any one of the aspects from the 57th to the 62nd the support (2) is circular and each one of the elongated ridges (93) is in the form of a continuous and straight rib extending across the support and having a length which is at least 90% the length of the support diameter.

In a 71st aspect according to any one of the aspects from the 57th to the 70th the one or more elongated ridges (93) and elongated indents (94) are symmetrically positioned with respect to an axis of symmetry of the support (2) and present respective portions running in correspondence of a peripheral annular band of the support.

In a 72nd aspect according to any one of the aspects from the 57th to the 71st the plastic film portion (4a) heat sealed to the product loaded support (2) and the product loaded support (2) are made from respective different materials.

In a 73rd aspect according to any one of the aspects from the 57th to the 72nd the support (2) presents a thickness comprised between 0.10 mm and 2.00 mm.

In a 74th aspect according to any one of the aspects from the 57th to the 73rd the support (2) is formed by one of the following:
- a sheet of paper,
- a sheet of cardboard,
- a multilayered structure comprising at least one layer of paper and at least one layer of cardboard,
- a multilayered structure comprising a plurality of layers of paper,
- a multilayered structure comprising a plurality of layers of cardboard,
- a plastic sheet,
- a multilayered structure comprising a plurality of layers of plastic,
- a multilayered structure comprising at least one continuous inner layer of paper sandwiched between at least one continuous top liner of plastic and at least one continuous bottom liner of plastic,
- a multilayered structure comprising at least one continuous inner layer of cardboard sandwiched between at least one continuous top liner of plastic and at least one continuous bottom liner of plastic.

In a 75th aspect according to any one of the aspects from the 57th to the 74th the plastic film portion (4a) presents a thickness comprised between 20 microns and 200 microns.

In a 76th aspect according to any one of the aspects from the 57th to the 75th, at atmospheric pressure and at least in an interval between 20° C. and 100° C., the plastic film of the plastic film portion (4a) has a coefficient of linear expansion per ° C. in at least one direction which is greater than the coefficient of linear expansion per ° C. in the same direction of the underlying support (2).

In a 77th aspect according to any one of the aspects from the 57th to the 76th the support (2) the plastic film portion (4a) is characterized by a free shrink at 160° C., in both the longitudinal and transversal directions (ASTM D2732), which is greater than 3% and less than 20%, preferably less than 15%, even more preferably than 10%.

In a 78th aspect according to any one of the aspects from the 57th to the 77th the support (2) has a residual shrink tension determined with the procedure disclosed in the detailed description, said residual shrink tension at 5° C. being at least 3 times, optionally at least 5 times, greater than the residual shrink tension at 100° C., in both the longitudinal and transversal directions.

A $79^{th}$ aspect concerns an apparatus for packaging a product arranged on a support (2) comprising:
- a film supply assembly (3) configured for supplying a plastic film (4);
- a base equipment (6) having an upper side (7) defining one or more receiving areas (8), each receiving area being configured for receiving at least one respective product loaded support (2);
- an upper tool (10) operative above the base equipment (6) and configured for holding a film portion (4a) of said plastic film (4) above the at least one product loaded support (2) positioned in the respective receiving area, the upper tool (10) and the base equipment (6) being configured to cooperate for heat sealing the film portion (4a) to said at least one product loaded support (2), wherein each receiving area (8) comprises:
- a flat portion (80) extending on a predetermined positioning plane (81) and defining a majority of the surface of the receiving area (8), and
- one or more elongated features (82) having an active surface extending out of the positioning plane of the flat portion (80).

In an $80^{th}$ aspect according to the $79^{th}$ aspect the one or more elongated features include a continuous rib extending across the respective receiving area above the positioning plane.

In an $81^{st}$ aspect according to any one of the preceding two aspects the one or more elongated features include a continuous body extending at the periphery of the respective receiving area above or below said positioning plane.

In an $82^{nd}$ aspect according to any one of the preceding three aspects each of the one or more elongated features extends along a respective ideal line of preferential development.

In an $83^{rd}$ aspect according to the preceding aspect each of the one or more elongated features extends along a respective ideal line of preferential development and has a length (l) measured along said ideal line of preferential development, a height (h) relative to the positioning plane (81), measured perpendicular to the positioning plane (81), and a width (w) measured parallel to the positioning plane and perpendicular to the ideal line of preferential development.

In an $84^{th}$ aspect according to the preceding aspect each elongated feature has the length (l) at least 2 times greater than the width (w).

In an $85^{th}$ aspect according to any one of preceding two aspects each elongated feature has the width (w) at least 50% of the height (h).

In an $86^{th}$ aspect according to any one of the preceding three aspects each elongated feature has the height (h) less than 10 mm.

In an $87^{th}$ aspect according to any one of the preceding four aspects each one of the elongated features (82) has the length (l) which is 5 times or more than the width (w) of the same elongated feature.

In a $88^{th}$ aspect according to any one of the preceding five aspects each one of the elongated features (82) has the width (w) which is equal to or greater than the height (h) of the same elongated feature.

In a $89^{th}$ aspect according to any one of the preceding six aspects each one of the elongated features (82) has the height (h) which is comprised between 0.1 and 5 mm.

In a $90^{th}$ aspect according to any one of the preceding seven aspects each one of the elongated features (82) has the width which is comprised between 0.1 and 30 mm.

In a $91^{st}$ aspect according to any one of the preceding eight aspects the one or more elongated features (82) comprise a plurality of elongated features (82) symmetrically positioned with respect to an axis of symmetry of the receiving area.

In a $92^{nd}$ aspect according to any one of the preceding nine aspects the elongated features (82) comprise:
 one or more first elongated features (83) extending along a first direction,
 one or more second elongated features (84) extending along a second direction at an angle to the first direction.

In a $93^{rd}$ aspect according to the preceding aspect the elongated features also include third elongated features (85) extending transversally to both said first and said second elongated features.

In a $94^{th}$ aspect according to any one of aspects from the $79^{th}$ to the $93^{rd}$ said elongated features (82) comprise elongated features (82) extending in correspondence of a peripheral band which encircles a central zone of the respective receiving area (8), and/or wherein the elongated features (82) comprise at least one elongated feature of annular shape extending along said peripheral band.

In a $95^{th}$ aspect according to any one of aspects from the $79^{th}$ to the $94^{th}$ said the one or more elongated features (82) include a plurality of non-parallel continuous ribs, optionally a plurality of non-parallel continuous straight ribs, extending at least across the respective receiving area (8) above the positioning plane.

In a $96^{th}$ aspect according to the preceding aspect each one of the receiving areas (8) is substantially in the form of a rectangle, optionally a square, and each one of the non-parallel continuous ribs has a length which is at least 75%, optionally at least 90%, the length of the longest side of said rectangle.

In a $97^{th}$ aspect according to the $95^{th}$ aspect each one of the receiving areas is substantially in the form of an ellipse, optionally a circle, and each one of the non-parallel continuous ribs has a length which is at least 75%, optionally at least 90%, the length of the longest axis of said ellipse.

In a $98^{th}$ aspect according to any one of aspects from the $83^{rd}$ to the $97^{th}$ the one or more elongated features (82) comprise at least one continuous body extending at the periphery of the respective receiving area (8) above or below said positioning plane at a height which is comprised between 0.1 and 10 mm.

In a $99^{th}$ aspect according to any one of aspects from the $83^{rd}$ to the $98^{th}$ the one or more elongated features (82) comprise at least one continuous body extending at the periphery of the respective receiving area (8) above or below said positioning plane at a height which is comprised between 0.1 and 5 mm.

In a $100^{th}$ aspect according to any one of the preceding two aspects the flat portion (80) of each receiving area is completely surrounded by the at least one respective continuous body which has an annular shape.

In a $101^{st}$ aspect according to the preceding aspect the continuous body has a substantially rectangular frame shape.

In a $102^{nd}$ aspect according to any one of the preceding two aspects the continuous body of annular shape is immediately adjacent to the peripheral border of the flat portion (80) and presents an upper surface extending on a respective lying plane staggered from the positioning plane (81) of the flat portion (80).

In a $103^{rd}$ aspect according to any one of the preceding five aspects the continuous body upper surface extends on a lying plane which located below and parallel to the positioning plane (81) of the flat portion (80), a distance between said positioning plane of the flat portion and said lying plane of the upper surface of the continuous body being equal to said height (h).

In a $104^{th}$ aspect according to any one of the preceding six aspects the continuous body upper surface extends on a lying plane which located above and parallel to the positioning plane (81) of the flat portion (80), a distance between said positioning plane of the flat portion and said lying plane of the upper surface of the continuous body being equal to said height (h).

In a $105^{th}$ aspect according to the preceding aspect the continuous body and the flat portion of each receiving area are relatively movable the one with respect to the other according to a direction perpendicular to said positioning plane (81) for adjusting said height (h).

In a $106^{th}$ aspect according to any one of aspects from the $79^{th}$ to the $105^{th}$ each one of the elongated features (82) is defined by a respective elongated element removably engaged to the upper side of the base equipment (6).

In a $107^{th}$ aspect according to any one of the preceding aspects each one of the elongated features (82) presents, in cross section, a rounded top contour.

In a $108^{th}$ aspect according to any one of the preceding aspects the base equipment (6) comprises a lower tool (11) cooperating with the upper tool (10) in correspondence of a packaging station (5) of the apparatus, and wherein the upper tool (10) and the lower tool (11) are relatively displaceable between:
 a first operating condition, where the upper tool (10) is sufficiently spaced from the lower tool (11) to allow positioning of one or more of said product loaded supports (2) below said film portion (4a) held by the upper tool (10), and
 a second operating condition, where the upper tool (10) is approached relative to the lower tool (11) and is configured to heat seal the at least one film portion (4a) to the at least one underlying product loaded support (2).

In a 109th aspect according to the preceding aspect the apparatus includes:
- a vacuum arrangement (13) configured for removing air at least from a volume between said at least one film portion (4a) and the one or more product loaded supports (2) located in the packaging station (5);
- suction apertures (18) distributed on an active surface (17) of the upper tool (10) and connected with said vacuum arrangement (13) or with an auxiliary vacuum arrangement (22);
- a heater (21) configured to heat at least a portion of the upper tool active surface (17);
- a control unit (100) configured for controlling the upper and lower tools (10, 11), the heater, the vacuum arrangement and optionally the auxiliary vacuum arrangement, wherein the control unit (100) is configured to execute the following cycle:
- causing the upper and lower tools (10, 11) to position in the first operating condition,
- with the upper and lower tools (10, 11) in the first operating condition,
  - commanding one of the vacuum arrangement (13) or the auxiliary vacuum arrangement (22) to cause suction of gas through said suction apertures (18) and hold the film portion (4a) against or close to said active surface (17),
  - commanding the heater (21) to cause heating of at least part of the film portion (4a) held by the upper tool (10),
- causing the upper and lower tools (10, 11) to move to the second operating condition,
- with the upper and lower tools (10, 11) in the second operating condition,
  - commanding the vacuum arrangement (13) to extract gas present between the at least one film portion (4a) and the underlying product loaded support (2),
  - commanding one of the vacuum arrangement (13) or the auxiliary vacuum arrangement (22) to cause re-venting with expulsion of gas through the suction apertures to release the film portion (4a) from the upper tool (10) active surface and drape down of the film portion (4a) onto the product loaded support (2), the film portion (4a) heat sealing to an upper surface of the support (2) not covered by the product forming at least one vacuum skin packaged product;

In a 110th aspect according to the 108th aspect the apparatus includes:
- a conveyor (12) configured for displacing one or more product loaded supports (2) along a predetermined path at least from a product loading station (9) to said packaging station (5);
- a vacuum arrangement (13) configured for removing air at least from a volume between said at least one film portion (4a) and the one or more product loaded supports (2) located in the packaging station (5);
- suction apertures (18) distributed on an active surface (17) of the upper tool (10) and connected with said vacuum arrangement (13) or with an auxiliary vacuum arrangement (22);
- a heater (21) configured to heat at least a portion of the upper tool active surface (17);
- a control unit (100) configured for controlling the conveyor (12), the upper and lower tools (10, 11), the heater, the vacuum arrangement and optionally the auxiliary vacuum arrangement, wherein the control unit (100) is configured to execute the following cycle:
- causing the upper and lower tools (10, 11) to position in the first operating condition,
- with the upper and lower tools (10, 11) in the first operating condition,
  - commanding one of the vacuum arrangement (13) or the auxiliary vacuum arrangement (22) to cause suction of gas through said suction apertures (18) and hold the film portion (4a) against or close to said active surface (17),
  - commanding the heater to cause heating of at least part of the film portion (4a) held by the upper tool (10),
  - causing the conveyor (12) to position one or more of said product loaded supports (2) on the respective receiving area (8) of the base equipment (6), below said film portion (4a) held by the upper tool (10),
- causing the upper and lower tools (10, 11) to move to the second operating condition,
- with the upper and lower tools (10, 11) in the second operating condition,
  - commanding the vacuum arrangement (13) to extract gas present between the at least one film portion (4a) and the underlying product loaded support (2),
  - commanding one of the vacuum arrangement (13) or the auxiliary vacuum arrangement (22) to cause re-venting with expulsion of gas through the suction apertures (18) to release the film portion (4a) from the upper tool (10) active surface and drape down of the film portion (4a) onto the product loaded support (2), the film portion (4a) heat sealing to an upper surface of the support (2) not covered by the product forming at least one vacuum skin packaged product.

In a 111th aspect according to the preceding aspect said receiving areas (8) are defined on an upper side of the conveyor (12) which is configured to cross the packaging station (5) above the lower tool (11)

In a 112th aspect according to the 109th aspect the receiving areas (8) are defined on an upper side of the lower tool (11) which is directly facing the upper tool (10).

A 113th aspect concerns a process of packaging a product arranged on a support (2) using the apparatus according to any one of the preceding aspects, wherein the process comprises the following steps:
- supplying a plastic film (4) from the film supply assembly (3);
- placing at least one product loaded support (2) on the respective receiving area (8) of the base equipment (6);
- holding a film portion (4a) of said plastic film (4) above the at least one support (2) loaded product positioned in the respective receiving area (8);
- heat sealing the at least one film portion (4a) of said plastic film (4) to the at least one respective of said product loaded supports (2).

A 114th aspect concerns a process of packaging a product arranged on a support (2) using the apparatus of any one of the preceding aspects 109th or 112th, wherein the packaging process comprises the following steps:
- positioning the upper and lower tools (10, 11) in the first operating condition;
- with the upper and lower tools (10, 11) in the first operating condition,
  - sucking gas through said suction apertures (18) and holding the film portion (4a) against or close to said active surface (17),
  - heating at least part of the film portion (4a) held by the upper tool (10), placing at least one product loaded support (2) located on the respective receiving area (8) of the base equipment (6) below said film portion (4a) held by the upper tool (10), moving the upper and lower tools (10, 11) to the second operating condition;

with the upper and lower tools (10, 11) in the second operating condition, extracting gas present between the at least one film portion (4a) and the underlying product loaded support (2), re-venting of gas through the suction apertures (18) and releasing the film portion (4a), allowing the film portion (4a) to drape down and heat seal to the product loaded support (2) forming at least one vacuum skin packaged product (P).

In a 115$^{th}$ aspect according to the preceding aspect wherein, with the upper and lower tools in said second operating condition, in particular during said step or steps of re-venting and/or of extracting gas, the one or more supports (2) are pressed against the respective receiving area (8) causing formation on the support (2) of elongated structures (93, 99) counter-shaped to the elongated features (82) present on the receiving area.

In a 116$^{th}$ aspect according to the preceding aspect each one of the one or more supports (2) presents a sheet body having a top surface, a bottom surface and a thickness, wherein the top and bottom surfaces of the sheet body, with the exclusion of said elongated structures formed during said re-venting and or gas extracting steps, are flat and extend along respective parallel top and bottom planes.

In a 117$^{th}$ aspect according to any one of the preceding two aspects each one of the one or more supports (2) presents, already before the packaging process takes place:
a sheet body having a top surface, a bottom surface and a thickness,
one or more preformed elongated structures.

A 118$^{th}$ aspect according to the preceding aspect the top and bottom surfaces of the sheet body, with the exclusion of said elongated formations, are flat and extend along respective parallel top and bottom planes.

A 119$^{th}$ aspect according to any one of the preceding two aspects the preformed elongated formations of each support (2) position above and engage corresponding elongated features (82) present on the respective receiving area defined in the base equipment (6).

A 120$^{th}$ aspect according to any one of the preceding three aspects each one of the preformed elongated structures is counter-shaped to a corresponding one of the elongated features.

In a 121$^{st}$ aspect according to any one of aspects from the 113$^{th}$ to the 120$^{th}$ the plastic film heat sealed to the product loaded support (2) and the product loaded support (2) are made from respective different materials.

In a 122$^{nd}$ aspect according to the preceding aspect, at atmospheric pressure and at least in an interval between 20° C. and 100° C., the plastic film has a coefficient of linear expansion per Celsius degree in at least one direction which is greater than the coefficient of linear expansion per Celsius degree in the same direction of the underlying support (2).

In a 123$^{rd}$ aspect according to any one of the preceding aspects from the 113$^{th}$ to the 122$^{nd}$ the support (2) presents a thickness comprised between 0.10 mm and 2.00 mm.

In a 124$^{th}$ aspect according to any one of aspects from the 113$^{th}$ to the 123$^{rd}$ the support is formed by one of the following:

a sheet of paper,
a sheet of cardboard,
a multilayered structure comprising at least one layer of paper and at least one layer of cardboard,
a multilayered structure comprising a plurality of layers of paper,
a multilayered structure comprising a plurality of layers of cardboard,
a plastic sheet,
a multilayered structure comprising a plurality of layers of plastic,
a multilayered structure comprising at least one continuous inner layer of paper sandwiched between at least one continuous top liner of plastic and at least one continuous bottom liner of plastic,
a multilayered structure comprising at least one continuous inner layer of cardboard sandwiched between at least one continuous top liner of plastic and at least one continuous bottom liner of plastic.

In a 125$^{th}$ aspect according to any one of aspects from the 113$^{th}$ to the 124$^{th}$ the plastic film presents a thickness comprised between 20 microns and 200 microns.

In a 126$^{th}$ aspect according to any one of aspects from the 113$^{th}$ to the 125$^{th}$ the plastic film is characterized by:
a free shrink at 160° C., in both the longitudinal and transversal directions (ASTM D2732), which is greater than 3% and less than 20%, preferably less than 15%, even more preferably than 10%.

In a 127$^{th}$ aspect according to any one of aspects from the 113$^{th}$ to the 126$^{th}$ the plastic film is characterized by:
a residual shrink tension, in both the longitudinal and transversal directions, determined with the procedure disclosed in the detailed description, said residual shrink tension at 5° C. being at least 3 times, optionally at least 5 times, greater than the residual shrink tension at 100° C.

In a 128$^{th}$ aspect according to any one of aspects from the 113$^{th}$ to the 127$^{th}$ each one of said one or more supports (2) presents through holes and wherein during gas extraction at least part of said extracted gas passes through one or more through holes present in the support (2), or wherein each one of said one or more supports (2) presents through holes and wherein the conveyor comprises a conveyor belt having gas passages and/or porous portions and during gas extraction the extracted gas passes through one or more through holes present in the support (2) and through one or more passages or gas permeable portions of the conveyor belt.

A 129$^{th}$ aspect concerns a vacuum skin package obtained with the process of any one of the preceding process related aspects.

In a 130$^{th}$ aspect according to the preceding aspect the vacuum skin package comprises
a product loaded support (2),
a plastic film portion (4a) heat sealed to a top surface of the product loaded support (2) not covered by the product,
wherein the support (2) presents:
a sheet body having a top surface (90), a bottom surface (91) and a thickness (92),
one or more elongated structures (93; 99),
wherein the top and bottom surfaces (90, 91) of the sheet body, with the exclusion of said one or more elongated structures (93; 99) are flat and extend along respective parallel top and bottom planes (95, 96),
wherein each of the one or more elongated structures (93; 99) has an active surface extending out of one or both the top and bottom planes (95, 96).

In a 131st aspect according to the preceding aspect, the one or more elongated structures (99) include a continuous ridge (93) extending across the support (2) above said top plane (95).

In a 132nd aspect according to any one of the preceding two aspects the one or more elongated structures (99) include a continuous flange (99) extending at the periphery of the respective support (2) above said top plane (95) or below said top plane (95), optionally below said bottom plane (96).

In a 133rd aspect according to any one of the preceding three aspects each of the one or more elongated structures extends along a respective ideal line of preferential development and has:
- a length (L') measured along said ideal line of preferential development,
- a height (H') relative to the top plane (95), measured perpendicular to the top plane (95),
- a width (W') measured parallel to the top plane and perpendicular to the ideal line of preferential development.

In a 134th aspect according to the preceding aspect the length (L') being at least 2 times greater than the width (W').

In a 135th aspect according to any one of the preceding two aspects the width (W') being at least 50% of the height (H').

In a 136th aspect according to any one of the preceding three aspects the height (H') being less than 10 mm.

In a 137th aspect according to any one of the preceding four aspects each one of the elongated structures (93; 99) has the length (L') which is 5 times or more than the width (W') of the same elongated structure.

In a 138th aspect according to any one of the preceding five aspects each one of the elongated structures (93; 99) has the width (W') which is equal to or greater than the height (H') of the same elongated structure.

In a 139th aspect according to any one of the preceding six aspects each one of the elongated structures (93; 99) has the height (H') which is comprised between 0.1 and 5 mm.

In a 140th aspect according to any one of the preceding seven aspects each one of the elongated structures (93; 99) has the width (W') which is comprised between 0.1 and 30 mm.

In a 141st aspect in accordance with any one of the preceding eight aspects the elongated structures comprise a continuous rib (93) extending across the support (2) above said top plane (95) and having a width (W') comprised between 0.1 and 10 mm.

In a 142nd aspect according to any one of the preceding nine aspects the elongated structures comprise a continuous flange (99) extending at the periphery of the respective support (2) below said top plane (95), optionally below said bottom plane (96), and having width (W') comprised between 5 mm and 30 mm.

In a 143rd aspect according to any one of the preceding ten aspects the one or more elongated structures (93; 99) are symmetrically positioned with respect to an axis of symmetry of the support (2).

In a 144th aspect according to any one of the preceding eleven aspects said elongated structures (93; 99) comprise:
- one or more first elongated structures extending along a first direction,
- one or more second elongated structures extending along a second direction at an angle to the first direction,
- optionally third elongated structures extending transversally to both said first and said second elongated features.

In a 145th aspect according to any one of the preceding twelve aspects said elongated structures (93; 99) comprise elongated structures extending in correspondence of a peripheral band which encircles a central zone of the support (2).

In a 146th aspect according to any one of the preceding thirteen aspects wherein the elongated structures (93; 99) comprise at least one elongated structure of annular shape extending along said peripheral band.

In a 147th aspect according to any one of the preceding fourteen aspects the one or more elongated structures (93) include a plurality of non-parallel continuous ribs, optionally a plurality of non-parallel continuous straight ribs, extending at least across the support (2) above the top plane (95).

In a 148th aspect according to the preceding aspect each one of the supports is substantially in the form of a rectangle, optionally a square, and each one of the non-parallel continuous ribs has a length which is at least 75%, optionally at least 90%, the length of the longest side of said rectangle.

In a 149th aspect according to any one of aspects from the 133rd to the 147th each one of the supports (2) is substantially in the form of an ellipse, optionally a circle, and each one of the non-parallel continuous ribs has a length which is at least 75%, optionally at least 90%, the length of the longest axis of said ellipse.

In a 150th aspect according to any one of the preceding seventeen aspects the one or more elongated structures (99) comprise at least one continuous flange extending at the periphery of the support (2) above or below said top plane (95) at a height (H') which is comprised between 0.1 and 10 mm.

In a 151st aspect according to any one of the preceding eighteen aspects the one or more elongated structures (99) comprise at least one continuous flange extending at the periphery of the support (2) above or below said top plane (95) at a height (H') which is comprised between 0.1 and 5 mm.

In a 152nd aspect according to any one of the preceding two aspects the at least one continuous flange completely surrounds a central portion of the support (2) and has an annular shape.

In a 153rd aspect according to any one of the preceding three aspects the at least one continuous flange completely surrounds a central portion of the support (2) and has a substantially rectangular frame shape.

In a 154th aspect according to any one of the preceding four aspects the at least one continuous flange completely surrounds a central portion of the support (2) and has a substantially rectangular frame shape wherein two first opposite rectilinear tracts of the continuous flange have constant width and wherein two second opposite rectilinear tracts perpendicular to the first two opposite rectilinear tracts of the continuous flange have constant width.

In a 155th aspect according to any one of the preceding five aspects the flange, in particular the flange having annular shape, is immediately adjacent to the peripheral border of the central portion of the support (2) and presents an upper surface extending on a respective lying plane staggered from the top plane of the support.

In a 156th aspect according to any one of the preceding six aspects the flange upper surface extends on a lying plane which located below and parallel to top plane (95) of the support (2), a distance between said lying plane of the upper surface of the flange and the top plane being equal to said height (H'); or the flange upper surface extends on a lying plane which located above and parallel to top plane (95) of the support (2), a distance between said lying plane of the upper surface of the flange and the top plane being equal to said height (H').

In a 157$^{th}$ aspect according to any one of aspects from the 130$^{th}$ to the preceding aspect each one of the elongated structures (99) presents, in cross section, a rounded top contour.

In a 158$^{th}$ aspect according to any one of aspects from the 130$^{th}$ to the preceding aspect the plastic film portion (4a) heat sealed to the product loaded support (2) and the product loaded support (2) are made from respective different materials.

In a 159$^{th}$ aspect according to any one of aspects from the 130$^{th}$ to the preceding aspect the support (2) presents a thickness comprised between 0.10 mm and 2.00 mm.

In a 160$^{th}$ aspect according to any one of aspects from the 130$^{th}$ to the preceding aspect the support (2) is formed by one of the following:
  a sheet of paper,
  a sheet of cardboard,
  a multilayered structure comprising at least one layer of paper and at least one layer of cardboard,
  a multilayered structure comprising a plurality of layers of paper,
  a multilayered structure comprising a plurality of layers of cardboard,
  a plastic sheet,
  a multilayered structure comprising a plurality of layers of plastic,
  a multilayered structure comprising at least one continuous inner layer of paper sandwiched between at least one continuous top liner of plastic and at least one continuous bottom liner of plastic,
  a multilayered structure comprising at least one continuous inner layer of cardboard sandwiched between at least one continuous top liner of plastic and at least one continuous bottom liner of plastic.

In a 161$^{st}$ aspect according to any one of aspects from the 130$^{th}$ to the preceding aspect the support (2) the plastic film portion (4a) presents a thickness comprised between 20 microns and 200 microns.

In a 162$^{nd}$ aspect according any one of aspects from the 130$^{th}$ to the preceding aspect at atmospheric pressure and at least in an interval between 20° C. and 100° C., the plastic film of the plastic film portion (4a) has a coefficient of linear expansion per ° C. in at least one direction which is greater than the coefficient of linear expansion per ° C. in the same direction of the underlying support (2).

In a 163$^{rd}$ aspect according any one of aspects from the 130$^{th}$ to the preceding aspect the plastic film portion (4a) is characterized by:
  a free shrink at 160° C., in both the longitudinal and transversal directions (ASTM D2732), which is greater than 3% and less than 20%, preferably less than 15%, even more preferably than 10%; and/or
  a residual shrink tension determined with the procedure disclosed in the detailed description, said residual shrink tension at 5° C. being at least 3 times, optionally at least 5 times, greater than the residual shrink tension at 100° C., in both the longitudinal and transversal directions.

In a 164$^{th}$ aspect according any one of aspects from the 130$^{th}$ to the preceding aspect the height (H') of the elongated structures, in particular the height of the continuous rib or ribs and/or the height of the continuous flange, is below 5 times the thickness the support (2), optionally below 3 times the thickness of the support (2).

BRIEF DESCRIPTION OF THE DRAWINGS

The present invention will become clearer by reading the following detailed description, given by way of example and not of limitation, to be read with reference to the accompanying drawings, wherein:

in FIG. 9 the receiving area comprises protruding elongated features positioned according to a first pattern;

in FIG. 11 the receiving area comprises protruding elongated features positioned according to a second pattern;

in FIG. 15 the receiving area comprises protruding straight features positioned in correspondence of a central zone of the receiving area and an annular feature in the form of a positive or negative annular step positioned peripherally relative to the central zone;

DEFINITIONS AND CONVENTIONS

Figure 1:
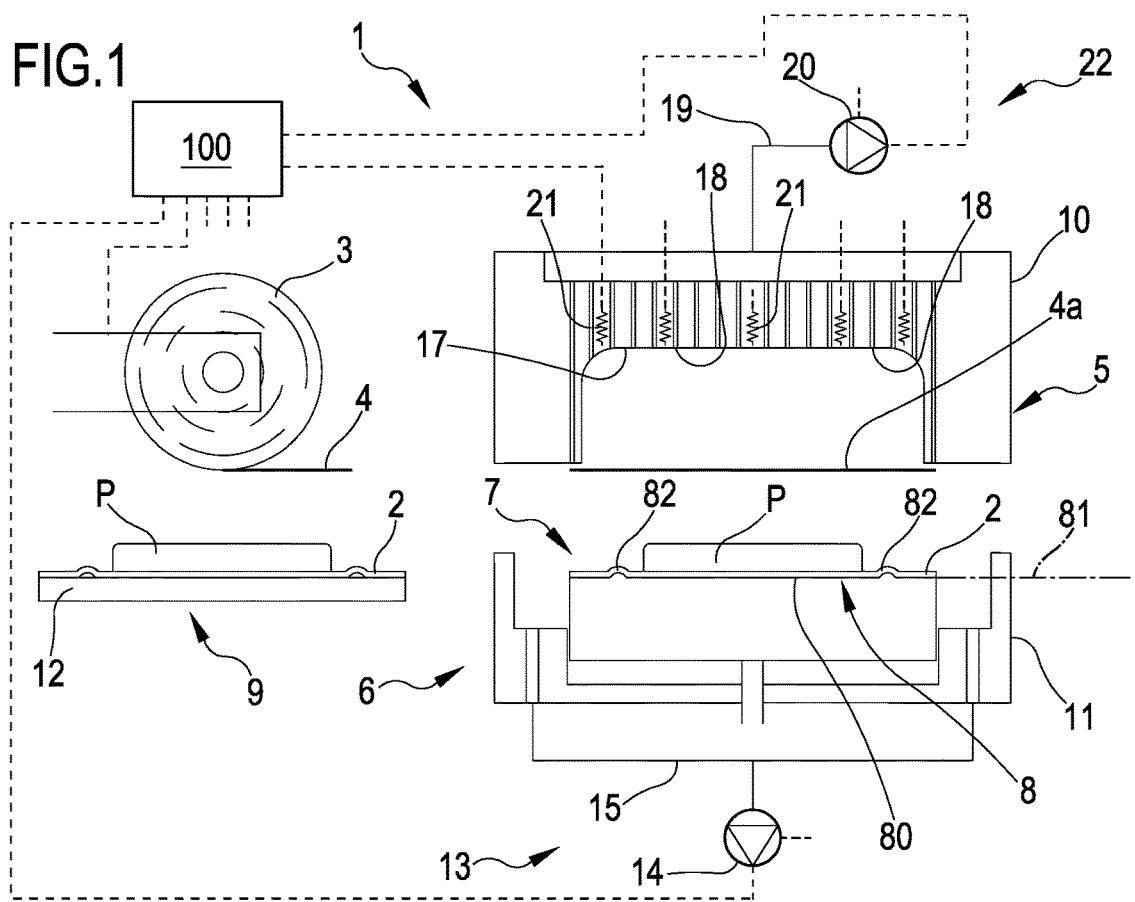
FIG. 1 is a schematic view of an apparatus for vacuum skin packaging of a product wherein the packaging station has the upper and lower tools are in a first operating condition.
Figure 2:
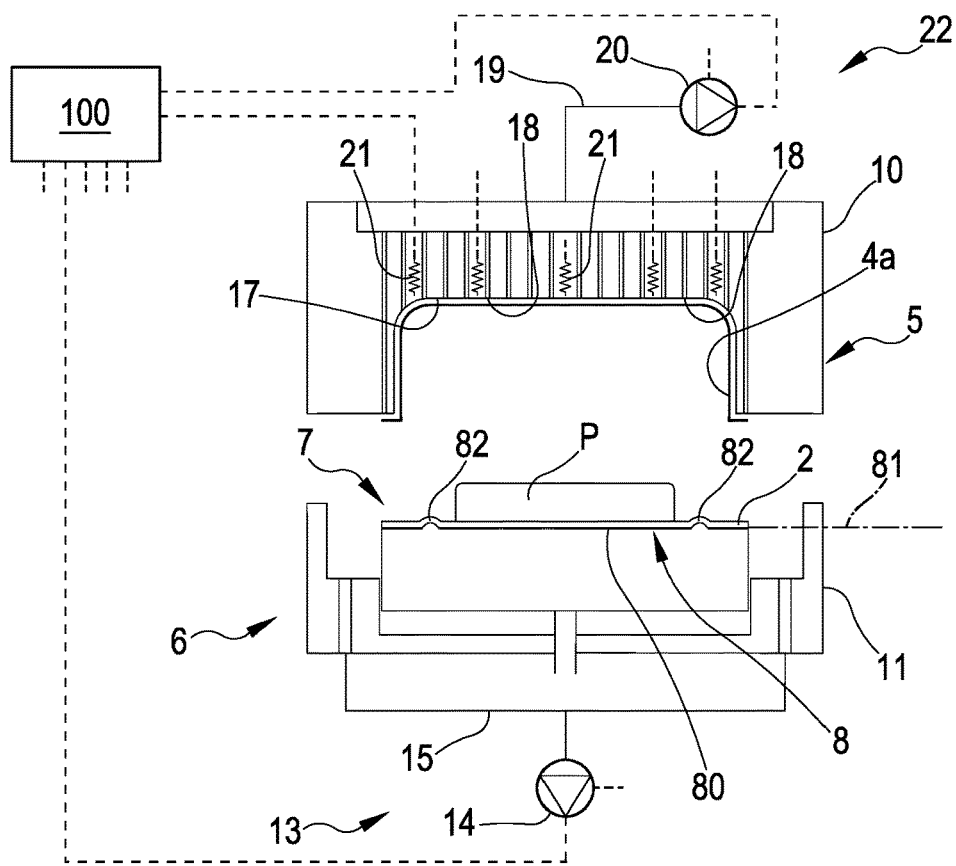
FIG. 2 is a schematic view of the apparatus of FIG. 1 in a subsequent phase of the packaging cycle, with the upper and lower tools in the first operating condition.

The same reference numerals are used to indicate corresponding parts or components in the figures. The figures may not be in scale and thus parts and components shown therein are schematic representations. In the following description and claims the apparatus and process refer to packaging of a product on a support or on a support portion: the product may be a food product or not.

With 'vacuum skin packaging' it is intended any packaging process where a product is placed on support or support portion and a film of plastic material is applied above the product loaded support, with air between the support and the plastic film being evacuated to cause the plastic film to drape down on the product and seal to the surface of the support, thus forming a tight skin on the product and on the support.

When describing each receiving area 8 of the base equipment 6, it is stated that the receiving area has a flat portion 80 extending on a predetermined positioning plane 81: this means that the flat portion is a flat surface part of the ideal positioning plane 81.

Each receiving area has one or more elongated features 82 with an active surface extending out the positioning plane 81, meaning that at least a part of the elongated features surface is not part of the positioning plane but rather projects above or below the positioning plane 81.

The ideal line of preferential development (i) of an elongated feature is the median line along which each feature extends parallel to the positioning plane 81: the ideal line (i) may be a straight line, a sequence of connected straight lines, a curvilinear line, an annular line formed by straight segments or by a curvilinear line or by a combination thereof.

By elongated feature it is meant any formation of the base equipment 6 (configured to contact a support 2) having length (l) which is significantly greater than the width (w), with the length and the width measured as indicated here below and as represented in the attached figures.

The geometry of each elongated feature is defined by:
  length (l), which is measured along the ideal line (i) of preferential development of each elongated feature,
  height (h), which is measured relative to the positioning plane 81 and perpendicular to the positioning plane 81; note the height can measure a distance above or below the positioning plane (and thus a positive or negative height relative to plane 81);
  width (w) measured parallel to the positioning plane and perpendicular to the ideal line (i) of preferential development.

The ideal line of preferential development (I') of an elongated structure 93, 99 present on the support 2 is the median line along which each structure extends parallel to top plane 95 along which extends the majority of the top surface 90 of each support. Also the ideal line (I') may be a straight line, a sequence of connected straight lines, a curvilinear line, an annular line formed by straight segments or by a curvilinear line or by a combination thereof.

By elongated structure it is meant any formation on the support 2 having length (L') which is significantly greater than the width (W'), with the length and the width measured as indicated here below and as represented in the attached figures. Each elongated structure of the supports 2 extend along a respective ideal line (I') of preferential development and the geometry of each elongated structure 93, 99 on the support 2 is defined by:
  a length (L') measured along said ideal line of preferential development (I');
  a height (H') relative to the top plane 95, measured perpendicular to the top plane 95; the height H' may measure a distance above or below the reference plane, which in this case is the top plane 95 of the support 2;
  a width (W') measured parallel to the top plane and perpendicular to the ideal line of preferential development.

The Supports 2

As used herein support means any discrete semi-rigid or flexible structure, such as for example a plate or a dish, designed for holding the product to be packaged which may have a rectangular shape or any other suitable shape, such as round, square, elliptical etcetera. In a possible currently preferred embodiment, the support may be a discrete flat element of uniform thickness.

Support may also mean a longitudinal tract of a continuous support of semi-rigid or flexible structure. Each support portion of the continuous support film is designed for holding the product to be packaged and may be flat and have uniform thickness.

The discrete support or the continuous support may be made in materials such as plastics, paperboard, paper, wood or in combinations of the mentioned materials. The discrete support or the continuous support may be single layer or multi-layer supports.

Plastic discrete or continuous supports may be manufactured by thermoforming or injection molding or cutting from foil material. Paper or paper board or wood supports discrete or continuous supports may be obtained by cutting or die cutting from foil material.

The discrete supports or the continuous supports may include through holes. Through holes may be obtained during manufacture of the discrete support or in a second phase, e.g., using an appropriate perforating tool part of the packaging apparatus. The through holes in the continuous support are preferably made using a hole making device which is part of the packaging apparatus or which operates upstream the packaging apparatus.

The discrete support or the continuous support present a base wall having a dimension, namely the thickness, which is significantly smaller than the other two dimensions.

In those cases where the support presents through holes, these holes form through passages across the entire thickness of the base wall of the support.

Each support 2 has top and bottom surfaces 90, 91 that, with the exclusion of said one or more elongated structures, 93, 99, are flat and extend along respective parallel top and bottom planes 95, 96.

The Film or Film Material Applied to the Support or Support Portions

Although most aspects of the invention are applicable to any type of packages obtained applying a plastic film to a support, the currently preferred application of the invention is for making vacuum skin packages. The film or film material heat sealed to the support or support portions in vacuum skin applications may be made of a flexible multi-layer material comprising at least a first outer heat-sealable layer, an optional gas barrier layer and a second outer heat-resistant layer. The outer heat-sealable layer may comprise a polymer capable of welding to the inner surface of the supports or support portions carrying the products to be packaged, such as for instance ethylene homo- or co-polymers, like LDPE, ethylene/alpha-olefin copolymers, ethylene/acrylic acid copolymers, ethylene/methacrylic acid copolymers, and ethylene/vinyl acetate copolymers, ionomers, co-polyesters, e.g. PETG. The optional gas barrier layer preferably comprises oxygen impermeable resins like PVDC, EVOH, polyamides and blends of EVOH and polyamides. The outer heat-resistant layer may be made of ethylene homo- or copolymers, ethylene/cyclic-olefin copolymers, such as ethylene/norbornene copolymers, propylene homo- or co-polymers, ionomers, (co)polyesters, (co)polyamides. The film may also comprise other layers such as adhesive layers or bulk layers to increase thickness of the film and improve its abuse and deep drawn properties. Particularly used bulk layers are ionomers, ethylene/vinyl acetate copolymers, polyamides and polyesters. In all the film layers, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odor absorbers, oxygen scavengers, bactericides, antistatic agents and the like additives known to those skilled in the art of packaging films.

One or more layers of the film can be crosslinked to improve the strength of the film and/or its heat resistance. Cross-linking may be achieved by using chemical additives or by subjecting the film layers to an energetic radiation treatment. The films for skin packaging are typically manufactured in order to show low shrink when heated during the packaging cycle. Those films, at 160° C., usually shrink less than 15%, more frequently less than 10%, even more frequently less than 8% in both the longitudinal and transversal direction (ASTM D2732). The films usually have a thickness comprised between 20 microns and 200 microns, more frequently between 40 and 180 microns and even more frequently between 50 microns and 150 microns.

Definitions and Conventions Concerning Materials

PVDC is any vinylidene chloride copolymers wherein a major amount of the copolymer comprises vinylidene chloride and a minor amount of the copolymer comprises one or more unsaturated monomers copolymerisable therewith, typically vinyl chloride, and alkyl acrylates or methacrylates (e.g. methyl acrylate or methacrylate) and the blends thereof in different proportions. Generally a PVDC barrier layer will contain plasticisers and/or stabilizers as known in the art.

As used herein, the term EVOH includes saponified or hydrolyzed ethylene-vinyl acetate copolymers, and refers to ethylene/vinyl alcohol copolymers having an ethylene comonomer content preferably comprised from about 28 to about 48 mole %, more preferably, from about 32 to about 44 mole % ethylene, and even more preferably, and a saponification degree of at least 85%, preferably at least 90%.

The term "polyamides" as used herein is intended to refer to both homo- and co- or ter-polyamides. This term specifically includes aliphatic polyamides or co-polyamides, e.g., polyamide 6, polyamide 11, polyamide 12, polyamide 66, polyamide 69, polyamide 610, polyamide 612, copolyamide 6/9, copolyamide 6/10, copolyamide 6/12, copolyamide 6/66, copolyamide 6/69, aromatic and partially aromatic polyamides or co-polyamides, such as polyamide 6I, polyamide 6I/6T, polyamide MXD6, polyamide MXD6/MXDI, and blends thereof.

As used herein, the term "copolymer" refers to a polymer derived from two or more types of monomers, and includes terpolymers. Ethylene homopolymers include high density polyethylene (HDPE) and low density polyethylene (LDPE). Ethylene copolymers include ethylene/alpha-olefin copolymers and ethylene/unsaturated ester copolymers. Ethylene/alpha-olefin copolymers generally include copolymers of ethylene and one or more comonomers selected from alpha-olefins having from 3 to 20 carbon atoms, such as 1-butene, 1-pentene, 1-hexene, 1-octene, 4-methyl-1-pentene and the like.

Ethylene/alpha-olefin copolymers generally have a density in the range of from about 0.86 to about 0.94 g/cm3. The term linear low density polyethylene (LLDPE) is generally understood to include that group of ethylene/alpha-olefin copolymers which fall into the density range of about 0.915 to about 0.94 g/cm3 and particularly about 0.915 to about 0.925 g/cm3. Sometimes linear polyethylene in the density range from about 0.926 to about 0.94 g/cm3 is referred to as linear medium density polyethylene (LMDPE). Lower density ethylene/alpha-olefin copolymers may be referred to as very low density polyethylene (VLDPE) and ultra-low density polyethylene (ULDPE). Ethylene/alpha-olefin copolymers may be obtained by either heterogeneous or homogeneous polymerization processes.

Another useful ethylene copolymer is an ethylene/unsaturated ester copolymer, which is the copolymer of ethylene and one or more unsaturated ester monomers. Useful unsaturated esters include vinyl esters of aliphatic carboxylic acids, where the esters have from 4 to 12 carbon atoms, such as vinyl acetate, and alkyl esters of acrylic or methacrylic acid, where the esters have from 4 to 12 carbon atoms.

Ionomers are copolymers of an ethylene and an unsaturated monocarboxylic acid having the carboxylic acid neutralized by a metal ion, such as zinc or, preferably, sodium.

Useful propylene copolymers include propylene/ethylene copolymers, which are copolymers of propylene and ethylene having a majority weight percent content of propylene, and propylene/ethylene/butene terpolymers, which are copolymers of propylene, ethylene and 1-butene.

As used herein, the term "polyolefin" refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and an non-olefinic co-monomer co-polymerizable with the olefin, such as vinyl monomers, modified polymers thereof, and the like. Specific examples include polyethylene homo-polymer, polypropylene homo-polymer, polybutene homo-polymer, ethylene-alpha-olefin co-polymer, propylene-alpha-olefin co-polymer, butene-alpha-olefin co-polymer, ethylene-unsaturated ester co-polymer, ethylene-unsaturated acid co-polymer, (e.g. ethylene-ethyl acrylate co-polymer, ethylene-butyl acrylate co-polymer, ethylene-methyl acrylate co-polymer, ethylene-acrylic acid co-polymer, and ethylene-methacrylic acid co-polymer), ethylene-vinyl acetate copolymer, ionomer resin, polymethylpentene, etc.

The term "polyester" is used herein to refer to both homo- and co-polyesters, wherein homo-polyesters are defined as polymers obtained from the condensation of one dicarboxylic acid with one diol and co-polyesters are defined as polymers obtained from the condensation of one or more dicarboxylic acids with one or more diols. Suitable polyester resins are, for instance, polyesters of ethylene glycol and terephthalic acid, i.e. poly(ethylene terephthalate) (PET). Preference is given to polyesters which contain ethylene units and include, based on the dicarboxylate units, at least 90 mol %, more preferably at least 95 mol %, of terephthalate units. The remaining monomer units are selected from other dicarboxylic acids or diols. Suitable other aromatic dicarboxylic acids are preferably isophthalic acid, phthalic acid, 2,5-, 2,6- or 2,7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the (C3-Ci9)alkanedioic acids are particularly suitable, in particular succinic acid, sebacic acid, adipic acid, azelaic acid, suberic acid or pimelic acid. Suitable diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Co-polyester resins derived from one or more dicarboxylic acid(s) or their lower alkyl (up to 14 carbon atoms) diesters with one or more glycol(s), particularly an aliphatic or cycloaliphatic glycol may also be used as the polyester resins for the base film. Suitable dicarboxylic acids include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid. Suitable amorphous co-polyesters are those derived from an aliphatic diol and a cycloaliphatic diol with one or more, dicarboxylic acid(s), preferably an aromatic dicarboxylic acid. Typical amorphous copolyesters include co-polyesters of terephthalic acid with an aliphatic diol and a cycloaliphatic diol, especially ethylene glycol and 1,4-cyclohexanedimethanol.

DETAILED DESCRIPTION

The enclosed figures show exemplifying aspects of several embodiments of the invention.

Referring to FIGS. 1-4 and 19, reference numeral 1 indicates an apparatus for packaging a product. In greater detail, the apparatus 1 provides for packaging a product P arranged on a support 2. The apparatus comprises a film supply assembly 3 configured for supplying a plastic film 4 to a packaging station 5 defined by the apparatus 1 as described here below. The apparatus 1 also includes a base equipment 6 having an upper side 7 defining one or more receiving areas 8 designed each one for receiving a respective support 2. As the support is typically a planar body, the receiving areas 8 are defined by indents or seats located on the upper side 7 of the base equipment configured for receiving the support. Alternatively, the receiving areas may be pre-established areas of the upper side of the base equipment; FIGS. 9-12 show possible examples of a receiving area 8. Each one of the receiving areas 8 is in particular configured for receiving at least one respective product loaded support 2, i.e., a support carrying a respective product P, which may be loaded on the support at a product loading station 9.

At the packaging station 5, the apparatus 1 presents an upper tool 10 operative above the base equipment 6 and configured for holding a film portion 4a of said plastic film 4 above the at least one product loaded support 2 positioned in the respective receiving area 8 of the upper side 7 of the base equipment 6. As shown in FIGS. 1-4, 19, the upper tool 10 and the base equipment 6 are configured to cooperate for heat sealing the film portion 4a to the product loaded support 2 which has reached the packaging station 5 and which is positioned on the respective receiving area 8 underneath and in alignment with the film portion 4a.

The apparatus 1 also comprises a lower tool 11 cooperating with the upper tool 10 in correspondence of packaging station 5; in greater detail, the upper tool 10 and the lower tool 11 are relatively displaceable between a first operating condition (see FIGS. 1 and 2, 19), where the upper tool is sufficiently spaced from the lower tool to allow positioning of one or more of product loaded supports 2 below the film portion 4a held by the upper tool 10, and a second operating condition (see FIGS. 3 and 4), where the upper tool 10 is approached relative to the lower tool 11 and is configured to heat seal the at least one film portion 4a to the at least one underlying product loaded support 2.

In the example of FIGS. 1-4 (this is however true also for the alternative of FIG. 19, although in this case only the first operating condition is shown), the upper tool and the lower tool, in correspondence of the second operating condition, contact each other in a gas tight manner forming a vacuum chamber 12 from which gas is extracted during the vacuum skin packaging process, as it will be explained here below. This feature is an option and may not be present if the apparatus 1 is only designed to heat seal the film portion 4a onto the respective support to form a lid without creating any vacuum.

As a matter of fact, the base equipment 6 may be quite simple and require an operator intervention to position the supports with a respective product on said receiving areas 8. Alternatively, the base equipment 6 may include a conveyor 12 configured for displacing one or more product loaded supports along a predetermined path at least from the product loading station 9 to the packaging station 5: the conveyor may include any suitable transfer device; for example, the conveyor may include a first transfer device (such as a belt, robotized arms, pincer chains, a displaceable plate or any other suitable device) bringing the product loaded supports next to the packaging station and a second transfer device (such as a belt, robotized arms, pincer chains, a displaceable plate or any other suitable device) picking the product loaded supports 2 and positioning them on the respective receiving areas 8 inside the packaging station 5.

Figure 3:
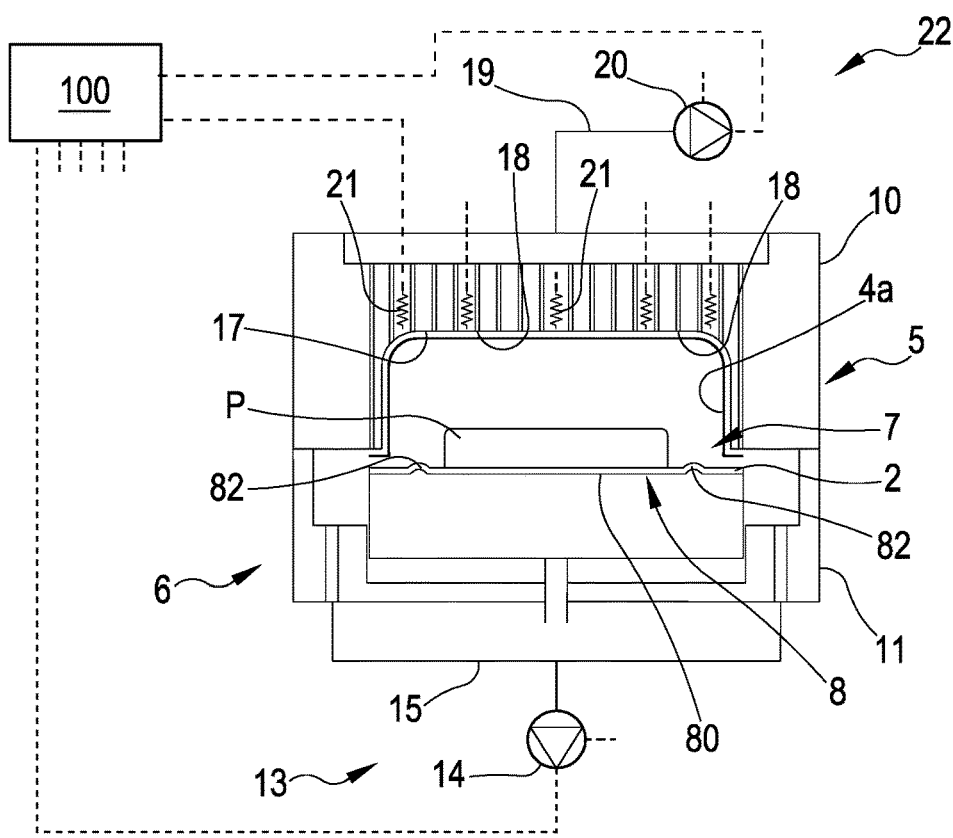
FIG. 3 is a schematic view of the apparatus of FIGS. 1 and 2 in phase of the packaging cycle subsequent to that of FIG. 2 and with the upper and lower tools in a second operating condition.
Figure 4:
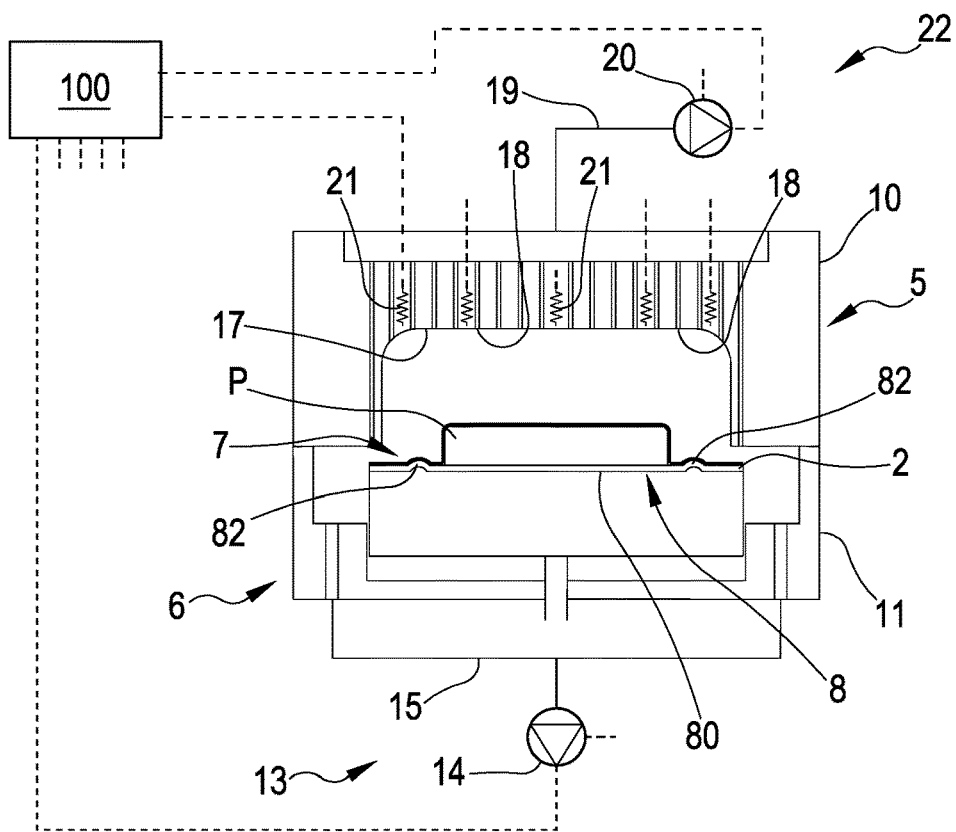
FIG. 4 is a schematic view of the apparatus of FIGS. 1-3, in a phase of the packaging cycle subsequent to that of FIG. 3, with the upper and lower tools in the second operating condition.

In FIGS. 1-4, 19, it is disclosed an apparatus 1 which is designed to form vacuum skin packages and which includes a vacuum arrangement 13 configured for removing air at least from a volume V between said at least one film portion 4a and the one or more product loaded supports 2 located in the packaging station on said receiving areas 8; as shown in FIG. 3, the vacuum arrangement 13 includes at least one vacuum pump 14 connected via suction lines 15 to the vacuum chamber 12. The vacuum pump 14 may be operated to suck air via the suction lines 15 and thus to remove gas from the vacuum chamber 12 and therefore also from the volume V between the film portion 4a and the underlying product loaded support 2. The upper tool 10 includes suction apertures 18 distributed on an active surface 17 of the same upper tool, opposite to and facing at the receiving area 8. The suction apertures 18 are connected with a vacuum source, which may be the same vacuum arrangement 13 described above or a dedicated auxiliary vacuum arrangement 22 as shown in FIGS. 1-4 where auxiliary suction lines 19 connect the suction apertures 18 to an auxiliary suction pump 20 of the auxiliary vacuum arrangement 22.

The apparatus also includes a heater 21 configured to heat at least a portion of the upper tool active surface 17; the heater, may be embedded in the upper tool and comprise a heating circuit for example using electric resistances or hot fluid to heat the active surface. It is however not excluded that other types of heaters suitable to heat the eating surface may be used, such as infrared lamps or other.

A control unit 100 is connected with and configured for controlling the conveyor 12 (if present), the upper and lower tools 10 and 11, the heater 21, the vacuum arrangement 13 and the auxiliary vacuum arrangement 22 (if present). The control unit may for instance control actuators (such as electric motors or fluid actuators) active on the conveyor, actuators (such as electric motors or fluid actuators) acting on the upper tool and/or on the lower tool, an actuation circuit connected with the heater, the pump(s) and/or valves part of the vacuum arrangement and/or of the auxiliary vacuum arrangement.

In greater detail, the control unit 100 is configured to execute the following packaging cycle:
first, the control unit 100 commands the appropriate motor(s) and/or actuator(s) and causes the upper and lower tools 10, 11 to position in the first operating condition;
then, with the upper and lower tools 10, 11 in the first operating condition, the control unit 100 commands one of the vacuum arrangement 13 or the auxiliary vacuum arrangement 22 (in FIGS. 1-4 and 19, the control unit commands the auxiliary vacuum arrangement 22) to cause suction of gas through the suction apertures 18; this allows to hold the film portion 4a against or close to said active surface 17 and above at least one corresponding product loaded support 2 present in the packaging station 5;
the control unit also 100 commands the heater 21 to cause heating of at least part of the (preferably the entire) film portion 4a held by the upper tool; this phase of heating the active surface 17 may start before even bringing the upper and lower tools 10, 11 in the first operating condition; alternatively, the heating phase may start immediately before, or when, causing suction through the suction apertures 18; in a further alternative the control unit 100 may be configured to keep the temperature of the active surface 17 at a constant temperature selected based on the material forming the film 4 during the entire packaging cycle and sufficient to confer to the film portion 4a sufficient deformability and stickiness;
If the apparatus includes a conveyor 12, then the control unit 100 (while the upper and lower tools are in the first operating condition) is also configured to command the conveyor motor or the conveyor actuator to cause the conveyor 12 to position one or more product loaded supports 2 on the respective receiving area 8 of the base equipment 6, below the film portion 4a held by the upper tool 10; if the apparatus 1 does not include an automated conveyor, then the operator shall position (while the upper and lower tools are in the first operating condition) the product loaded supports 2 on the respective receiving area 8 of the base equipment 6 below the film portion 4a held by the upper tool 10;
the control unit 100, is also configured to subsequently cause the upper and lower tools to move to the second operating condition;
then, with the upper and lower tools 10 and 11 in the second operating condition, the control unit 100 commands the vacuum arrangement to extract gas present in the vacuum chamber 12 and specifically to extract gas from the volume V between the film portion 4a and the underlying product loaded support 2 (see FIGS. 3 and 4); during this phase, the auxiliary vacuum arrangement (or a designated part of the vacuum arrangement) continues to suck via suction apertures 18 to keep the film portion 4a in adhesion with the upper tool 10;
after a designated time-out period from start of the extraction of gas from chamber 12 or once a designated level of vacuum has been reached in said chamber 12, the control unit 100 commands the vacuum arrangement or the auxiliary vacuum arrangement to cause re-venting of gas through the suction apertures 18: this causes release of the film portion from the active surface 17 and allows the film portion to effectively drape down and heat seal to the product loaded support 8 in correspondence of a top surface of the support not covered by the product to form at least one vacuum skin packaged product (FIG. 4); the re-venting phase may comprise either connecting the suction apertures 18 to the atmospheric pressure outside the apparatus or pumping of air into line 19 and into apertures 18: in both cases due to the vacuum level reached under the film portion 4a and in particular in volume V, as soon as the re-venting phase starts, the film portion is subject to a pressure differential which pushes the film portion down against the product loaded support 2; it should also be noted that in certain embodiments the re-venting phase starts only once at least a peripheral band of the film portion 4a has been heat sealed to a corresponding peripheral band of the support 2.

Figure 5:
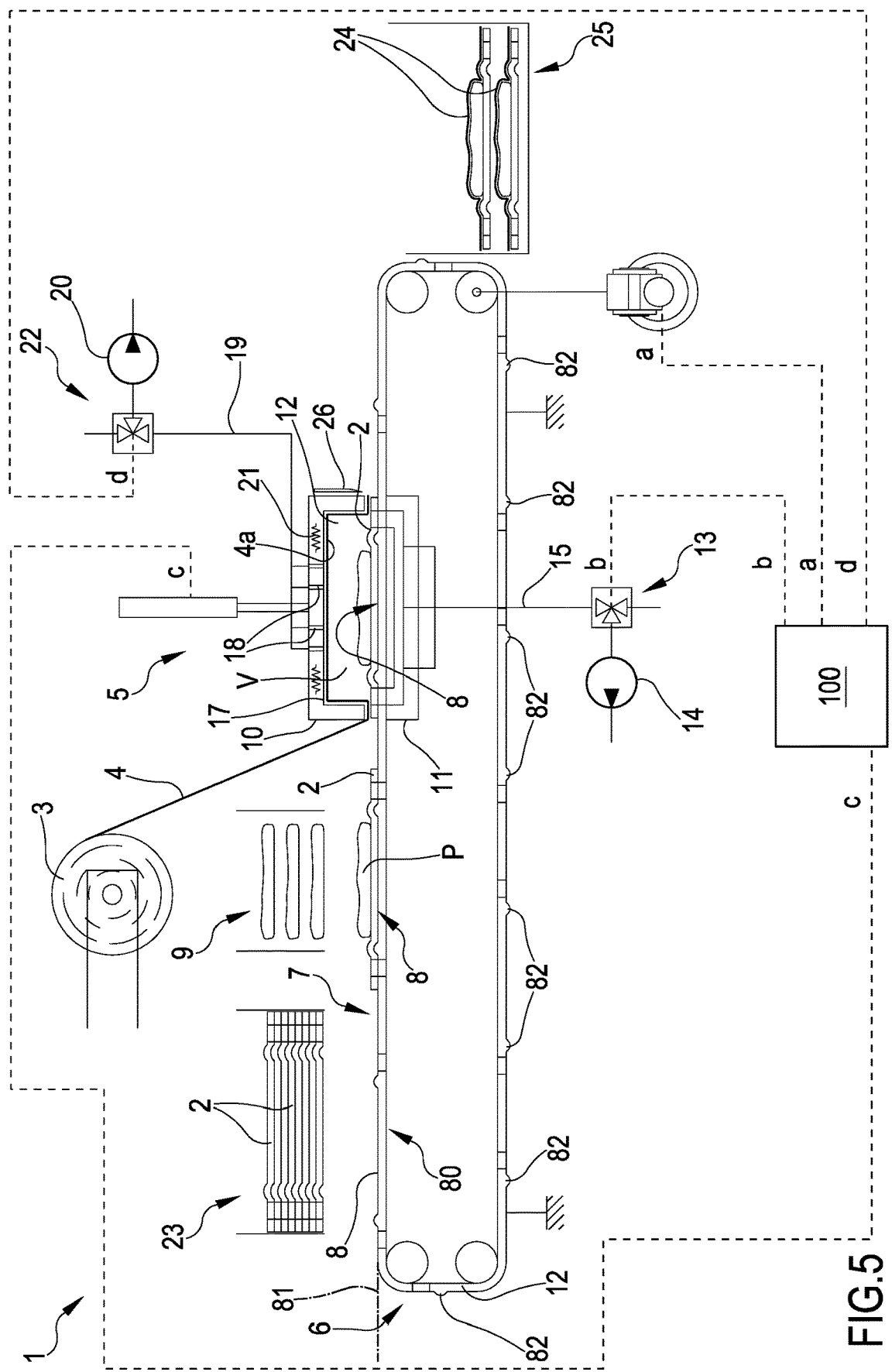
FIG. 5 is a schematic view of a further apparatus for vacuum skin packaging of a product using a conveyor, in particular an endless conveyor belt, passing through the upper and lower tools.

The packaging apparatus 1 shown in FIG. 5 comprises the same components described above, which are therefore identified with same reference numbers adopted in FIGS. 1-4. In detail, the apparatus 1 of FIG. 5 includes a film supply assembly 3 configured for supplying a plastic film 4 to a packaging station 5. The apparatus 1 also includes a base equipment 6 having an upper side 7 defining one or more receiving areas 8 designed each one for receiving a respective support 2 carrying a respective product which may be loaded on the support at a product loading station 9. At the packaging station 5, the apparatus 1 presents an upper tool 10 operative above the base equipment 6 and configured for holding a film portion 4a of plastic film 4 above the at least one product loaded support 2 positioned in the respective receiving area 8 of the upper side 7 of the base equipment 6. The upper tool 10 and the base equipment 6 are configured to cooperate for heat sealing the film portion 4a to the product loaded support 2 which has reached the packaging station 5 and which is positioned on the respective receiving area 8 underneath and in alignment with the film portion 4a. In the apparatus of FIG. 5, the conveyor 12 crosses the packaging station 5 and the receiving areas 8 are defined on an upper side of the conveyor. In greater detail, the conveyor 12 comprises at least one endless conveyor belt which is configured such as to have a branch constantly passing through the packaging station above lower tool 11. Lower tool 11 cooperates with the upper tool 10 and with the conveyor 12 in correspondence of a packaging station 5; in greater detail, the upper tool 10 and the lower tool 11 are relatively displaceable between a first operating condition, where the upper tool is sufficiently spaced from the lower tool to allow positioning of one or more of product loaded supports 2 below the film portion 4a held by the upper tool 10, and a second operating condition (see FIG. 5), where the upper tool 10 is approached relative to the lower tool 11 and to the upper side of the conveyor 12 to heat seal the at least one film portion 4a to the at least one underlying product loaded support 2.

In the example of FIG. 5, in correspondence of the second operating condition, the upper tool acts against the upper side of the branch of conveyor 12 passing through the packaging station (with possible interposition of a peripheral border of the film portion 4a as in the example of FIG. 5), while the lower tool acts on the lower side of the same branch thereby forming a vacuum chamber 12 from which gas is extracted during the vacuum skin packaging process, as it will be explained here below. This feature of the apparatus of FIG. 5 may not be present if the apparatus 1 of FIG. 5 is only designed to heat seal the film portion 4a onto the respective support to form a lid without creating any vacuum.

As mentioned, the base equipment 6 of the apparatus of FIG. 5 includes conveyor 12 in the form of an endless conveyor belt configured for displacing one or more product loaded supports 2 along a predetermined path at least from the product loading station 9 to the packaging station 5. The supports 2 may come from a support store 23 located upstream the product loading station 9, move on the conveyor to the product loading station 9 where they receive a product P, and are then directed to the packaging station where the film portion 4a is applied to form packages 24 which are then moved to a package collecting station 25.

The apparatus 1 of FIG. 5 is designed to form vacuum skin packages and includes a vacuum arrangement 13 configured for removing air at least from a volume V between said at least one film portion 4a and the one or more product loaded supports 2 located in the packaging station on said receiving areas 8; as shown in FIG. 3, the vacuum arrangement 13 includes at least one vacuum pump 14 connected via suction lines 15 to the vacuum chamber 12. The vacuum pump 14 may be operated to suck air via the suction lines 15 and thus to remove gas from the vacuum chamber 12 and therefore also from the volume V between the film portion 4a and the underlying product loaded support 2.

The upper tool 10 includes suction apertures 18 distributed on an active surface 17 of the same upper tool, opposite to and facing at the receiving area 8. The suction apertures 18 are connected with a vacuum source, which may be the same vacuum arrangement 13 described above or a dedicated auxiliary vacuum arrangement 22 where auxiliary suction lines 19 connect the suction apertures 18 to an auxiliary suction pump 20 of the auxiliary vacuum arrangement 22.

The apparatus also includes a heater 21 configured to heat at least a portion of the upper tool active surface 17; the heater, may be embedded in the upper tool and comprise a heating circuit for example using electric resistances or hot fluid to heat the active surface. It is however not excluded that other types of heaters suitable to heat the eating surface may be used, such as infrared lamps or other. Control unit 100 is connected with and configured for controlling the conveyor 12, the upper and lower tools 10 and 11, the heater 21, the vacuum arrangement 13 and the auxiliary vacuum arrangement 22 (if present). The control unit 100 may for instance control actuators (such as electric motors or fluid actuators) active on the conveyor, actuators (such as electric motors or fluid actuators) acting on the upper tool and/or on the lower tool, an actuation circuit connected with the heater, the pump(s) and/or valves part of the vacuum arrangement and/or of the auxiliary vacuum arrangement.

In greater detail, the control unit 100 is configured to execute the following packaging cycle:

first, the control unit 100 commands the appropriate motor(s) and/or actuator(s) and causes the upper and lower tools 10, 11 to position in the first operating condition;

then, with the upper and lower tools 10, 11 in the first operating condition, the control unit 100 commands one of the vacuum arrangement 13 or the auxiliary vacuum arrangement 22 (in FIG. 5, the control unit commands the auxiliary vacuum arrangement 22) to cause suction of gas through the suction apertures 18; this allows to hold the film portion 4a against or close to said active surface 17 and above at least one corresponding product loaded support 2 present in the packaging station 5;

the control unit also 100 commands the heater 21 to cause heating of at least part of the (preferably the entire) film portion 4a held by the upper tool 10; this phase of heating the active surface 17 may start before even bringing the upper and lower tools 10, 11 in the first operating condition; alternatively, it may start immediately before, or when, causing suction through the suction apertures 18; in an alternative, the control unit 100 may be configured to keep the temperature of the active surface 17 at a constant temperature selected based on the material forming the film 4 during the entire packaging cycle;

the control unit 100 (while the upper and lower tools are in the first operating condition) is also configured to command the conveyor motor or the conveyor actuator to cause the conveyor 12 to position one or more product loaded supports 2 on the respective receiving area 8 of the base equipment, below the film portion 4a held by the upper tool 10; note the control unit may also control the product loading station and the support store such that the entire process be automatized by controlling deposition of the supports from the store onto the conveyor branch and subsequent deposition of the product on the respective support;

the control unit 100, is also configured to subsequently cause the upper and lower tools to move to the second operating condition; in the example of FIG. 5, when the first and second tool 10 and 11 reach the second operating condition the lower tool tightly abuts on a lower face of the conveyor, while the upper tool tightly abuts against the upper face of the same conveyor (with at most interposition of the film portion 4a);

then, with the upper and lower tools in the second operating condition, the control unit 100 commands the vacuum arrangement to extract gas present in the vacuum chamber 12 and specifically to extract gas from the volume V between the film portion 4a and the underlying product loaded support 2 (see FIGS. 3 and 4); during this phase, the auxiliary vacuum arrangement (or a designated part of the vacuum arrangement) continues to suck via suction apertures 18 to keep the film portion 4a in adhesion with the upper tool 10; note that in the example of FIG. 5 the support presents through holes aligned with corresponding holes or gas permeable portions of the conveyor such that gas extracted from volume V passes through the support holes, the conveyor and then is evacuated;

after a designated time-out period from start of the extraction of gas from chamber 12 or once a designated level of vacuum has been reached in said chamber 12, the control unit 100 commands the vacuum arrangement or the auxiliary vacuum arrangement to cause re-venting of gas through the suction apertures 18: this causes release of the film portion from the active surface 17 and allows the film portion to effectively drape down and heat seal to the product loaded support 8 in correspondence of a top surface of the support not covered by the product to form at least one vacuum skin packaged product; the re-venting phase may comprise either connecting the suction apertures 18 to the atmospheric pressure outside the apparatus or pumping of air into line 19 and into apertures 18: in both cases due to the vacuum level reached under the film portion 4a and in particular in volume V, as soon as the re-venting phase starts, the film portion is subject to a pressure differential which pushes the film portion down against the product loaded support; it should also be noted that in certain embodiments the re-venting phase starts only once at least a peripheral band of the film portion 4a has been heat sealed to a corresponding peripheral band of the support 2.

Figure 6:
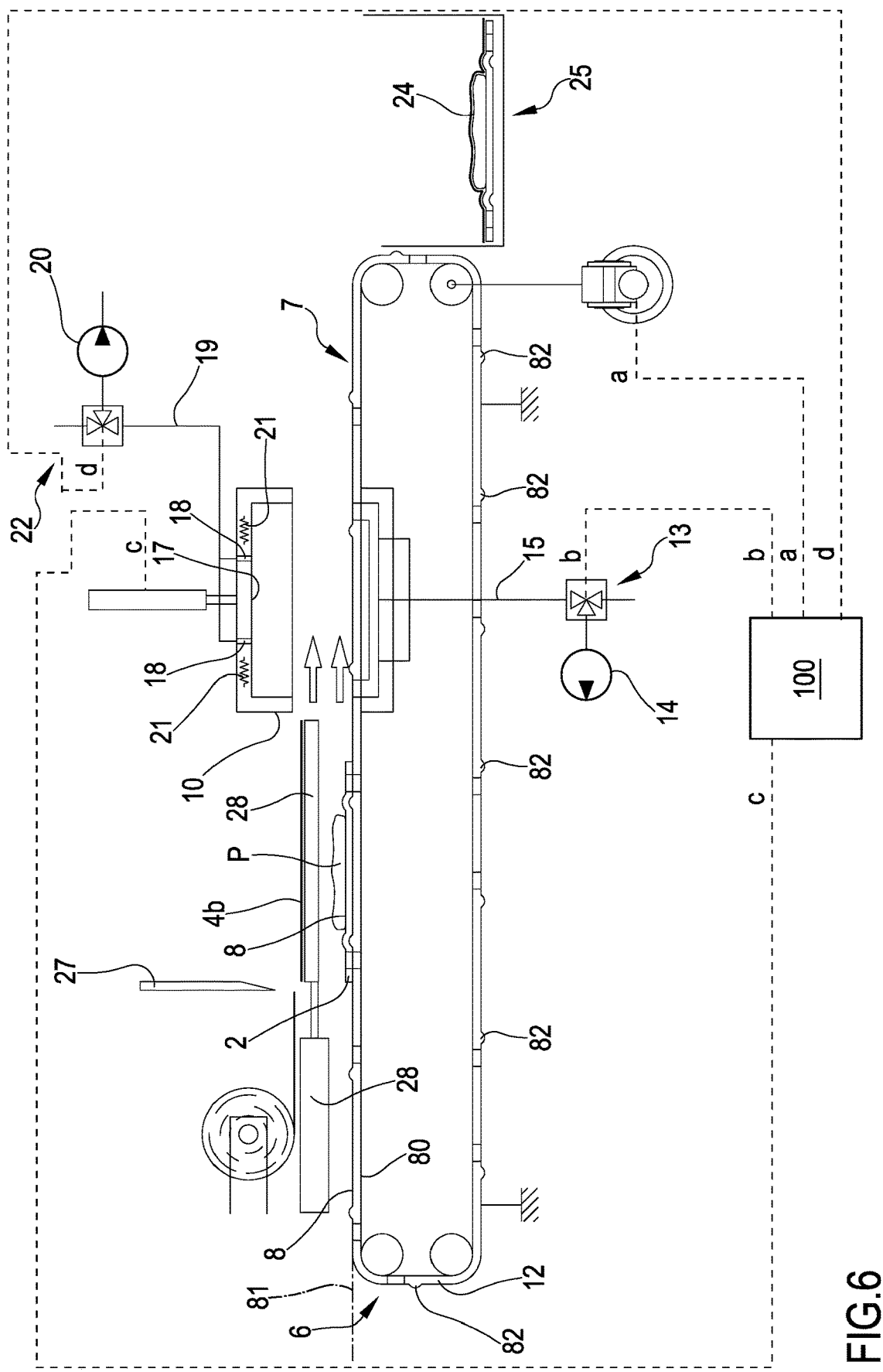
FIG. 6 is a schematic view of a variant of the apparatus of FIG. 5 also using a conveyor, in particular an endless conveyor belt, passing through the upper and lower tools.

The apparatus of FIG. 6 is very similar to that of FIG. 5: the only difference is that in the apparatus of FIG. 5 the film 4 is fed by film supply 9 as a continuous web which is then cut by a cutter 26 operative at or downstream the packaging station 5, whilst in the apparatus of FIG. 6 a cutting station 27 is active immediately downstream the film supply station to form cut film sheets 4b which are then displaced into the packaging station and below the upper tool with the aid of an oscillating platform 28 also controlled by a motor or by an actuator 29 commanded by control unit 100.

Figure 7:
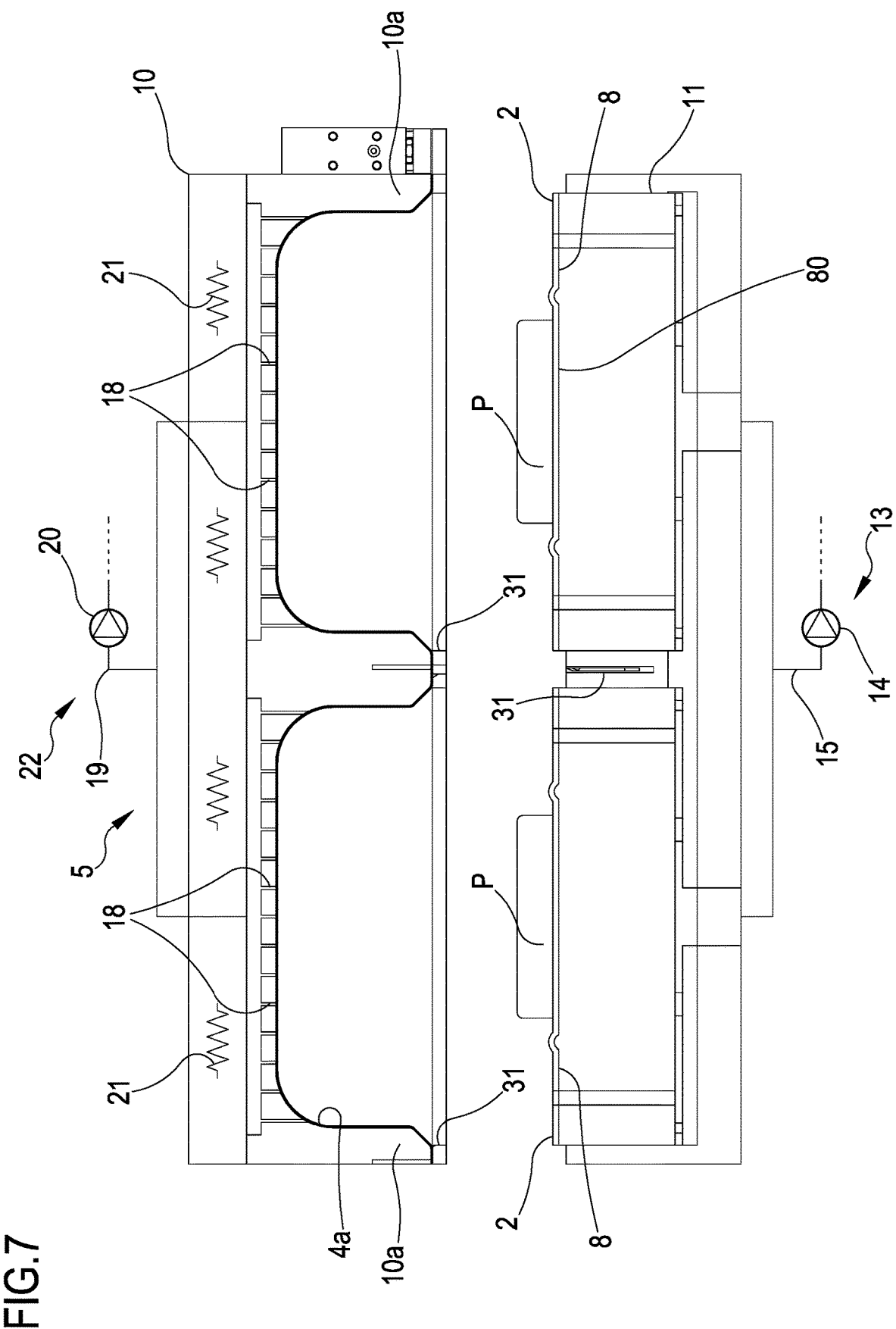
FIG. 7 is a schematic view of a detail of the packaging station, for example usable in an apparatus of the type of FIG. 1, with the upper and lower tools in a first operating condition, wherein the packaging station has upper and lower tools configured for forming a plurality of packages at each packaging cycle.
Figure 8:
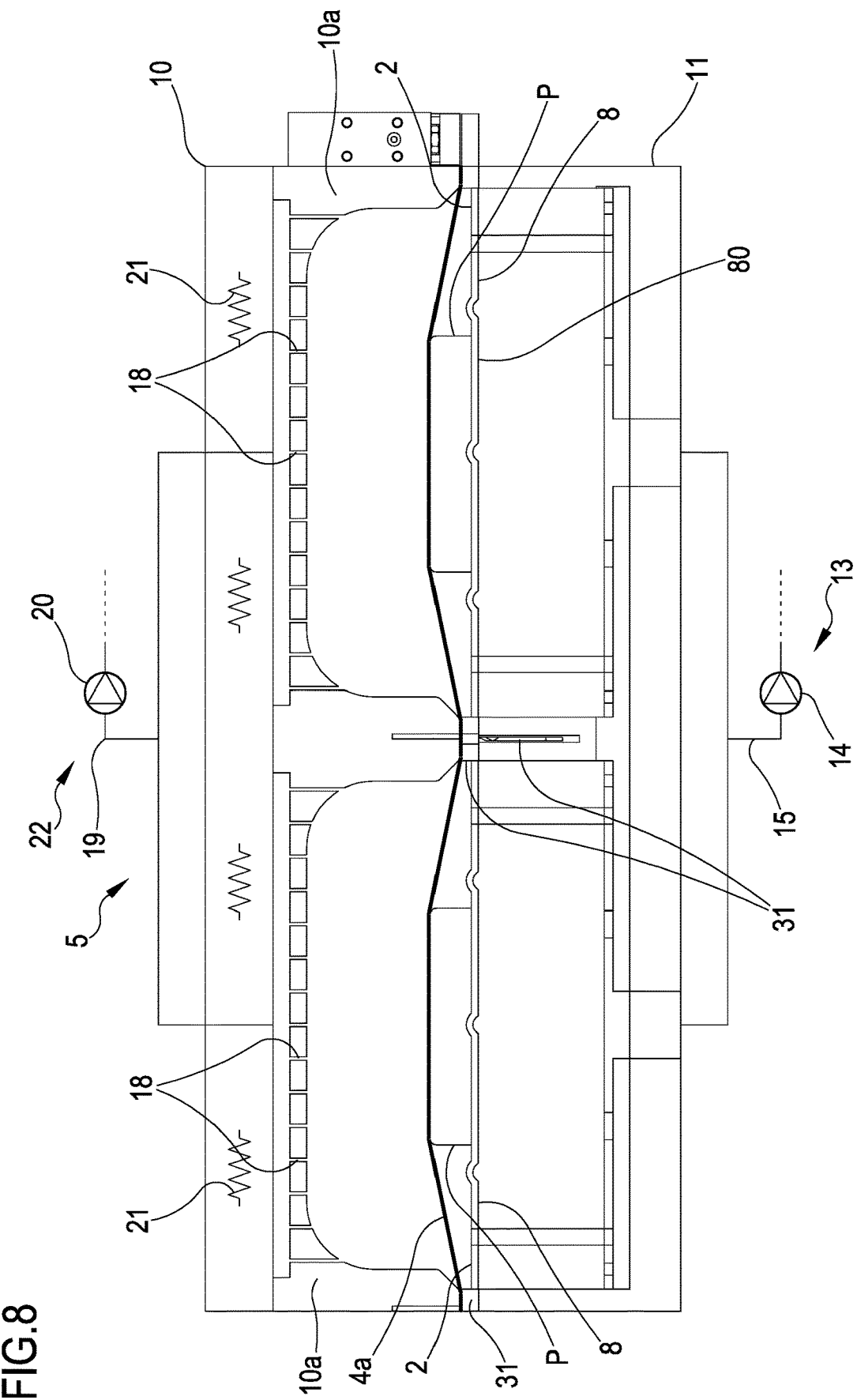
FIG. 8 is a schematic view of a detail of the packaging station of FIG. 7 with the upper and lower tools in a second operating condition.

FIGS. 7 and 8 disclose a variant of the packaging station 5 of the apparatus of FIGS. 1-4 (note that in FIGS. 7 and 8 the same components or parts of the apparatus of FIG. 1 are identified with same reference numbers used in FIG. 1). According to this variant, the upper and lower tools 10 and 11 are designed to receive two adjacent product loaded supports 2 and thus to create two vacuum skin packages per packaging cycle. Furthermore, the packaging station 5 includes a clamping device 30, which may be in the form of a frame with a plurality of (in this case two) apertures 31 interposed between the upper tool 10 and the lower tool 11 and controlled such as to clamp the film portion 4a against a periphery 10a of the upper tool 10 to allow suction of air through the suction apertures 18 and thus adherence of the film portion to the active surface of the upper tool with no risk that during suction, and even in presence of pronounced deformation imparted to the film) the film portion 4a might slip or shift from its proper position. Furthermore, one of the upper and the lower tools 10, 11 includes a cutting device 31: in FIGS. 7 and 8 the cutting device 31 is hosted in the lower tool 11 and comprises at least one vertically oscillating blade which may be controlled such that, once the film portion 4a has been heat sealed to the underlying supports, the same film portion is cut to separate the vacuum skin packages.

Figure 15:
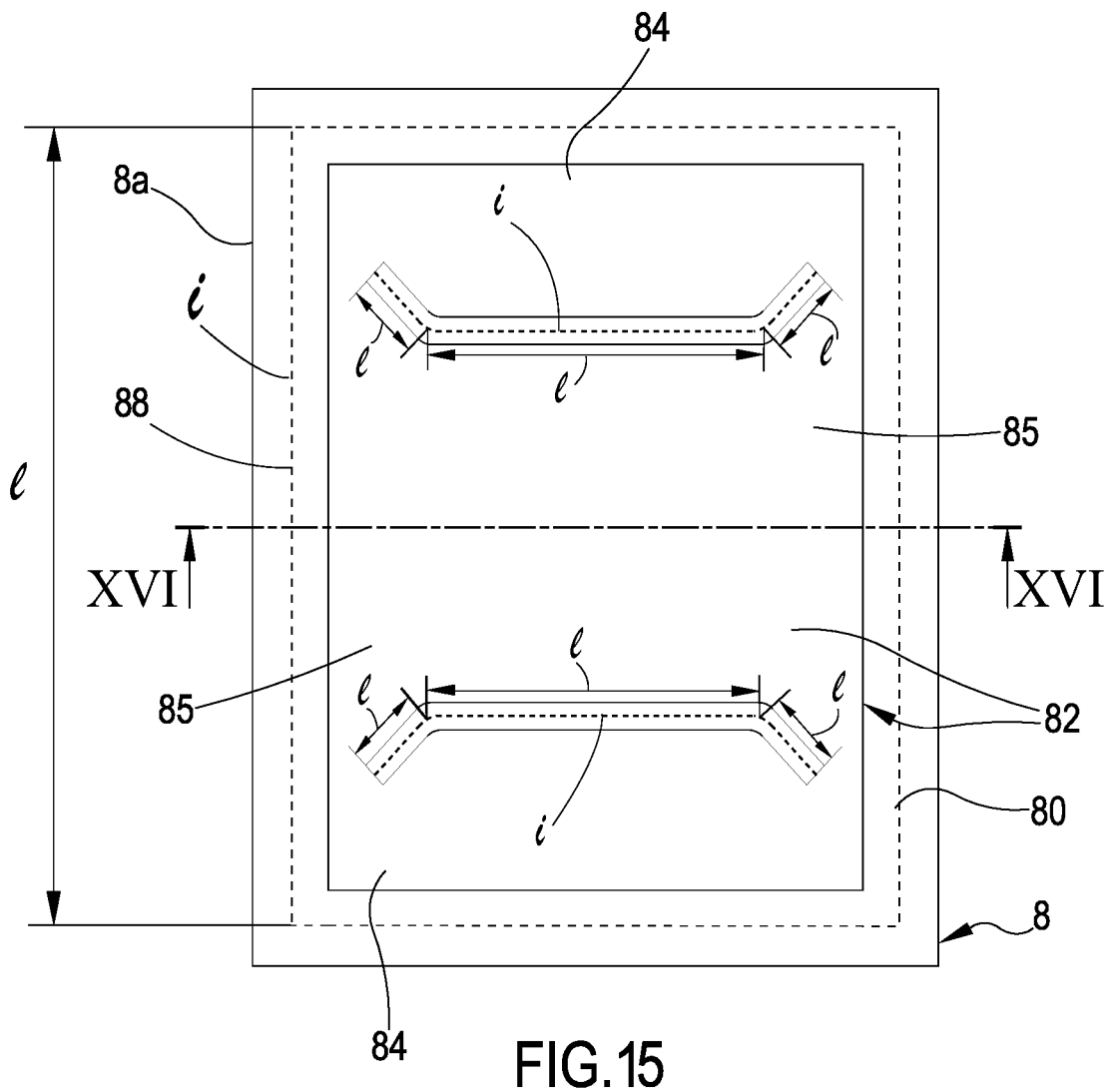
FIG. 15 shows a top view of a portion of the upper side of a base equipment, usable in the apparatus of any one of FIGS. 1-8, where one receiving area for a product loaded support is defined.
Figure 16A:
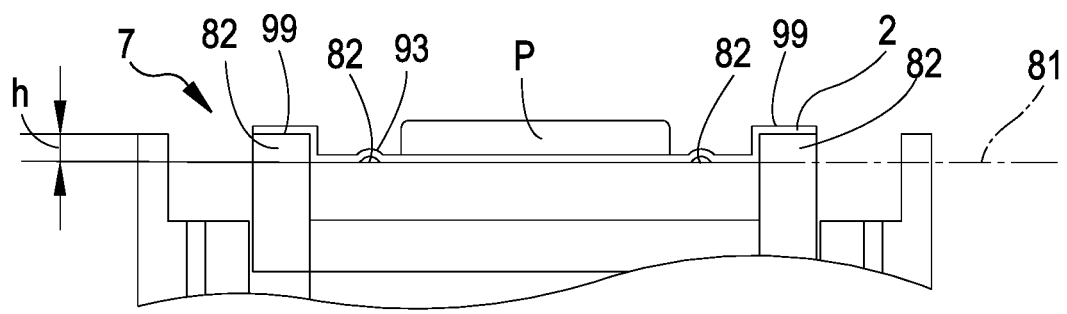
FIGS. 16A and 16B represent a cross section along plane XVI-XVI of FIG. 15 respectively in the case where the receiving area has a positive annular step and in the case the receiving area has a negative annular step surrounding the central zone.
Figure 16B:
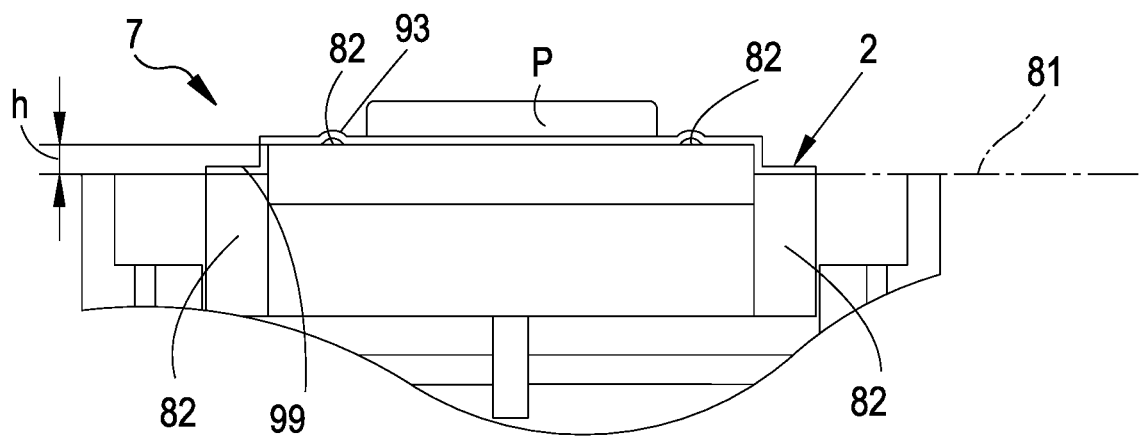
Figure 19:
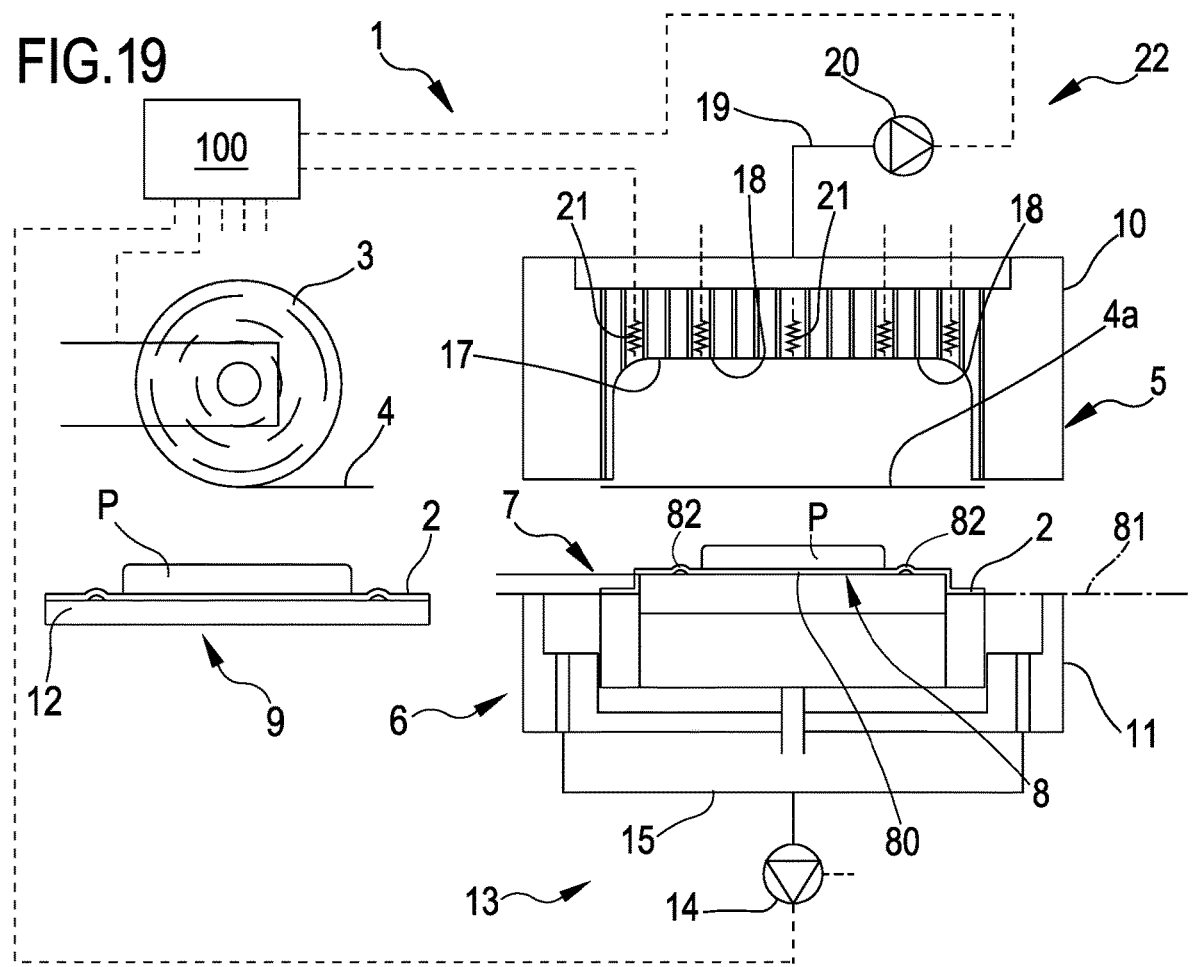
FIG. 19 is a schematic view of an apparatus for vacuum skin packaging of a product wherein the packaging station has the upper and lower tools are in a first operating condition and wherein the base equipment is of the type shown in FIG. 16B.

FIG. 19, discloses another variant of the packaging station 5 of the apparatus of FIGS. 1-4. In particular, the packaging station of FIG. 19 corresponds to that of FIGS. 1-4 but for certain details of the base equipment 6 and lower tool 11. As shown in FIG. 19 a portion of the upper side of the base equipment 6 defines at least one receiving area for a product loaded support (2); in the case of FIG. 19 the lower tool has a central lower tool and a peripheral lower tool which may be positioned as shown in FIG. 19 with the peripheral lower tool 11a having a top surface slightly below compared to the top surface of the central lower tool 11b. Alternatively, the peripheral lower tool may have a top surface slightly above compared to the top surface of the central lower tool. FIG. 15 shows a top view of a possible receiving area defined by the base equipment 6 of FIG. 19 and FIGS. 16A and 16B represent a cross section along plane XVI-XVI of FIG. 15 respectively in the case where the receiving area has a positive annular step (thereby using the peripheral lower tool with a top surface slightly above the central lower tool) and in the case the receiving area has a negative annular step surrounding the central zone (thus using the peripheral lower tool with a top surface slightly below the central lower tool as shown in FIG. 19); note the relative positioning of the peripheral lower tool and of the central lower tool may me adjusted by an operator before operation of the packaging apparatus or it may be automatically controlled by control unit 100 based on operator inputs or on pre-stored programs with the control unit acting on one or more appropriate actuators operative on the base equipment.

After the above general description of the apparatus of FIGS. 1-4, of FIGS. 5-6, of FIGS. 7-8 and of FIG. 19, here below a detailed description of certain novel aspects of the invention is provided. These novel aspects may be applied to any one of the apparatus described above and shown in figures from 1 to 8, 9-12, 15, 16A, 16B and 19.

The Receiving Areas 8

According to one aspect, each one of the receiving areas 8 defined on the top of base equipment, either on the lower tool upper side (FIGS. 1-4, 7, 8 and 19) or on the conveyor upper side (FIGS. 5 and 6), includes a flat portion 80 extending on a predetermined positioning plane 81 and defining a majority of the surface of the receiving area 8 and one or more elongated features 82 protruding above the positioning plane 81 of flat portion 80. In other words, each one of the receiving areas has at least 75%, preferably more the 85%, of the surface which is flat, with the elongated features being relatively narrow and elongated ribs and representing the sole discontinuity from the planarity of the support receiving areas.

FIGS. 9-12 show a portion of the upper side 7 of the base equipment, which may either be part of the top side of the lower tool 11 or of a conveyor 12 crossing the packaging station 5. As shown in FIGS. 9-12, the elongated features 82 may include one or more first elongated features 83 extending along a first direction, and one or more second elongated features 84 extending along a second direction at an angle to the first direction. For example, the first elongated features 83 may be a plurality of elongated parallel protrusions and the second elongated features 84 may be a plurality of parallel elongated protrusions directed transversally, optionally perpendicularly, to the first elongated features.

Figure 9:
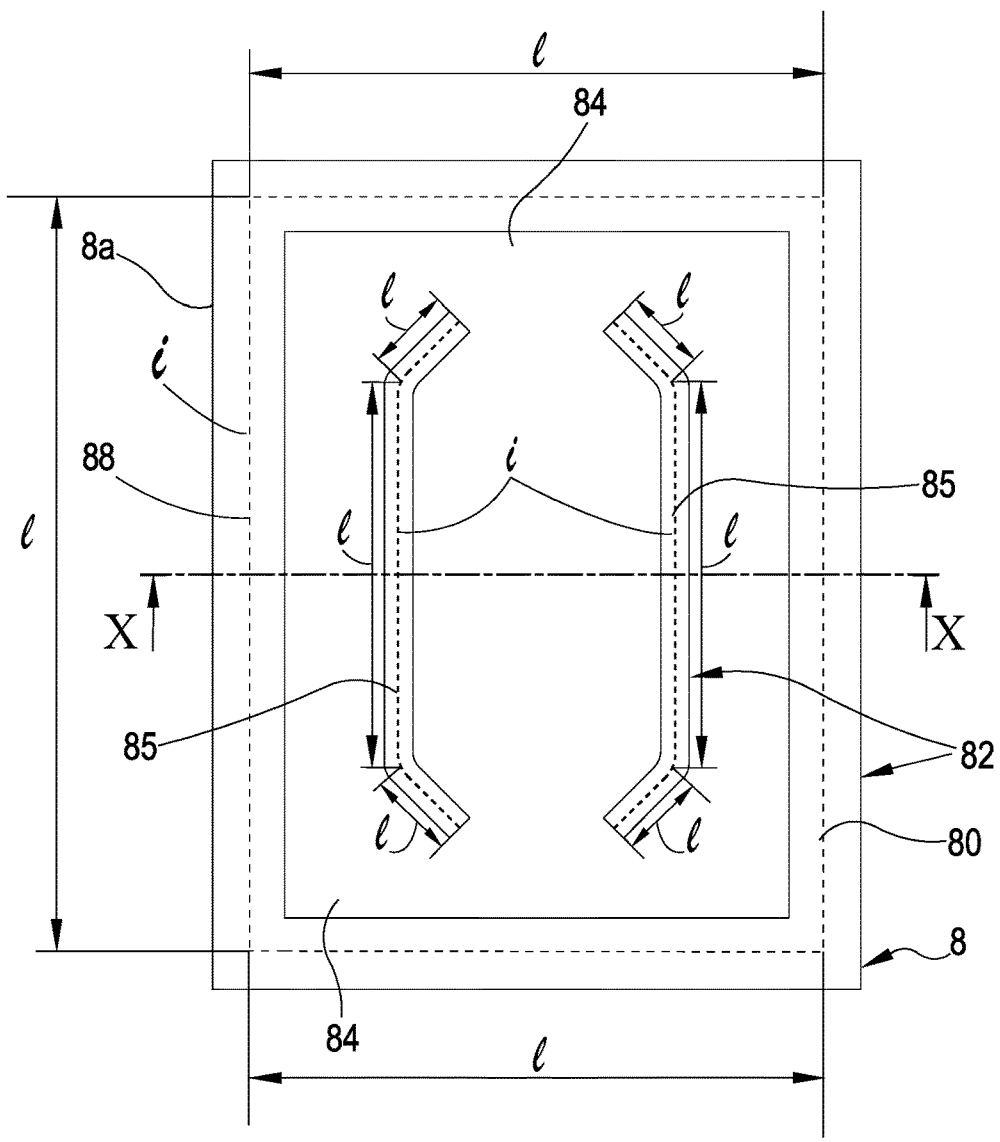
FIG. 9 shows a top view of a portion of the upper side of a base equipment, usable in the apparatus of any one of the preceding figures, wherein one receiving area for a product loaded support is defined.
Figure 10:
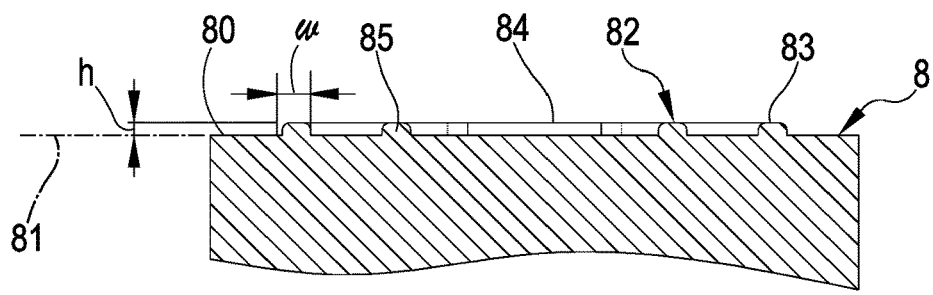
FIG. 10 is a cross section along plane X-X of FIG. 9.

In FIGS. 9-10 it is shown a solution where the first elongated 83 features comprise two elongated parallel protrusions and the second elongated features 84 comprise two parallel elongated protrusions perpendicular to the first elongated features. In practice, in the example of FIGS. 9-10, the mentioned first and second elongated features 83, 84 form an annular feature which encircles a central zone of the respective receiving area 8; the annular feature is located in correspondence of a peripheral band of the respective receiving area: in fact the annular feature is much closer to the edge 8a of the receiving area than to the center of the same receiving area and encircles a central zone of the receiving area. In the example of FIGS. 9-10, there are also two optional additional elongated features 85 disposed symmetrically on the respective receiving area 8 and each presenting a major straight portion parallel to one of said first or second elongated features and terminal bent portions directed towards the symmetrically opposite additional elongated feature 85.

Figure 11:
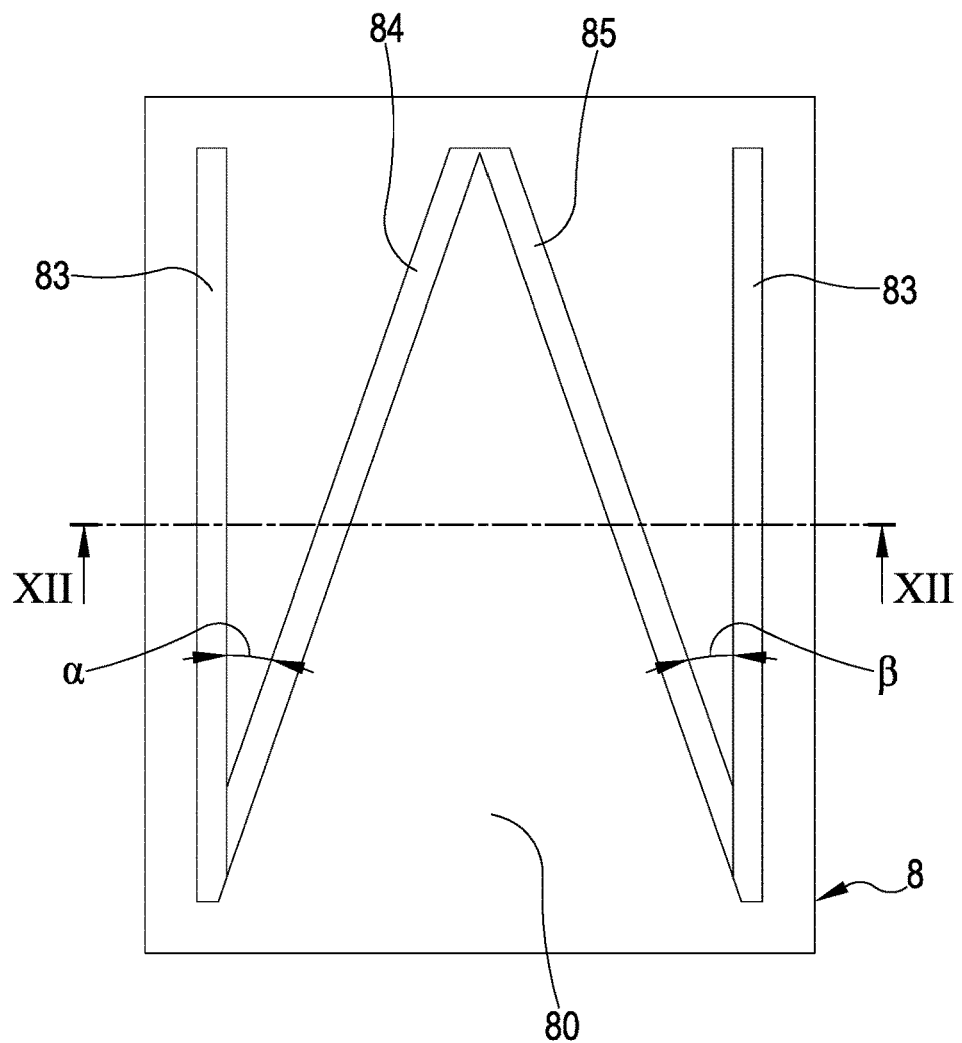
FIG. 11 shows a top view of a portion of the upper side of a base equipment, usable in the apparatus of any one of FIGS. 1-8, where one receiving area for a product loaded support is defined.
Figure 12:
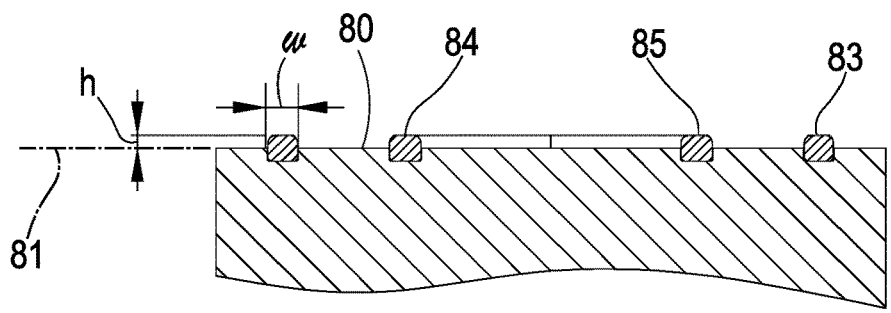
FIG. 12 is a cross section along plane XII-XII of FIG. 11.

Note that the elongated features 82 may also include third or fourth elongated features directed transvers to the first and second elongated features. In FIGS. 11 and 12 it is shown an example where first elongated features 83 in the form of straight parallel protrusions extend parallel to the edge of the receiving area 8a, one second elongated feature 84 in the form of a straight protrusion extends at an acute angle α with one of the first elongated features and a third elongated feature 85 in the form of a straight protrusion extends at an acute angle β with respect to the other of said first elongated features 83, thereby forming a pattern of elongated features which is symmetrical and shaped as a M when seen from above.

Going now in structural detail, and for example referring to FIGS. 9-12, each one of the elongated features is in the form of a continuous, optionally straight, rib extending across the respective receiving area.

For example, FIGS. 9-12 show elongated features in the form of continuous ribs extending across the respective receiving area above the positioning plane; each the one or more elongated features extends along a respective ideal line of preferential development and is characterized by:
- a length (l) measured along said ideal line of preferential development,
- a height (h) relative to the positioning plane 81, measured perpendicular to the positioning plane 81,
- a width (w) measured parallel to the positioning plane and perpendicular to the ideal line of preferential development.

In the examples of FIGS. 9-12 the length (l) is at least 2 times, optionally at least 10 times, greater than the width (w), the width (w) is at least 50% of the height (h), and the height (h) being is than 10 mm and preferably less than 5 mm.

More in detail each one of the elongated features 82 has length (l) which is 5 times or more than the width (w) and width (w) which is equal to or greater than the height (h) of the same elongated feature. For example, each one of the elongated features 82 can be a continuous rib of height (h) comprised between 0.1 and 5 mm, width which is comprised between 0.1 and 30 mm and length which can be more than 50 mm.

The receiving area is typically in the form of a rectangle and each one of the elongated features is in the form of a continuous, optionally straight, rib extending across the respective receiving area and having a length which is at least 75%, optionally 90%, the length of the longest side of said rectangle. If the receiving area is in the form of an ellipse (or a circle), then each one of the elongated features is in the form of a continuous, optionally straight, rib extending across the respective receiving area and having a length which is at least 75%, optionally 90%, the length of the longest axis of the ellipse (or the diameter of the circle).

In one embodiment (see FIG. 12), each one of the elongated features may be defined by a respective elongated element removably engaged to the upper side of the base equipment. For example each one of the elongated features may comprise a respective bar which is coupled in a removable manner to the lower tool or to the conveyor in order to modify the surface thereof as desired. Alternatively (see FIG. 10), the lower tool or the conveyor may be made with a respective top surface with preformed elongated features. The elongated features, not only serve to form or maintain corresponding ridges on the support (as it is apparent from the present overall description), but also are used as elements to center in proper position on the receiving area each respective support (this may be particularly advantageous when using holed supports having through holes, which need to be aligned with corresponding gas suction channels on the conveyor 12 or in the lower tool 11).

In a possible variant, each one of the elongated features protrudes above the positioning plane 81 to define a feature height h (see FIGS. 10, 12) above the positioning plane comprised between 0.1 and 2.0 mm. In other words, each of the receiving areas may be basically flat with the elongated features representing no more than elongated and narrow ribs slightly emerging above the mainly flat top surface of the receiving area.

Additionally, according to a further aspect, each one of the elongated features presents, in cross section, a rounded top contour. This allows avoiding any possibility of cutting or lacerating the supports during the packaging cycle.

As shown in the above described embodiments, it is a currently preferred solution adopting elongated features forming patterns on the receiving areas symmetrically positioned with respect to a longitudinal axis of symmetry of the receiving area.

With reference now to the examples of FIGS. 15, 16A and 16B the one or more elongated features 82 comprise one continuous body 88 extending at the periphery of the respective receiving area forming a flat surface positioned above (FIG. 16A) or below (FIG. 16B) the positioning plane. The height h relative to the positioning plane 81 is comprised between 0.1 and 10 mm, optionally between 0.1 and 5 mm above or below the plane 81. In a currently preferred embodiment, the continuous body forms a flat surface which is below the positioning plane a height of about 0.1 to 2 mm. As shown in FIG. 15, the receiving area may also comprise elongated features in the form of continuous rib of the type described herein above I connection with FIGS. 9-12.

Going back to the continuous body 88, the flat portion 80 of each receiving area is completely surrounded by the respective continuous body which has an annular shape: in particular in FIG. 15 is shown a continuous body of a substantially rectangular frame shape. The continuous body 88 of annular shape is immediately adjacent to the peripheral border of the flat portion 80 and presents an upper surface extending on a respective lying plane 89 staggered from the positioning plane 81 of the flat portion 80, with the distance between said positioning plane of the flat portion and said lying plane of the upper surface of the continuous body being equal to the height h as shown in FIGS. 16A and 16B. Note that the base equipment 6 may be designed such that the continuous body and the flat portion of each receiving area are relatively movable the one with respect to the other according to a direction perpendicular to said positioning plane 81 for adjusting said height h.

The Support 2

Each one of the one or more supports 2 presents a sheet body having a top surface 90, a bottom surface 91 and a thickness 92; one or more elongated structures 99 may be pre-formed on the supports.

As an alternative, the supports 2 may be initially perfectly flat and then, when the packaging cycle takes place, the flat supports are pushed against the top surface of the conveyor or of the lower tool (this takes place during re-venting phase in a vacuum skin packaging cycle, as explained above). The pressure and heat formed the support 2 and compel the support to take the same shape of the underlying receiving area 8, thus providing the initially flat support with elongated structures 93 and/or 99 exactly shaped as the elongated features 82 present on the top surface of the lower tool or of the conveyor.

Figure 13:
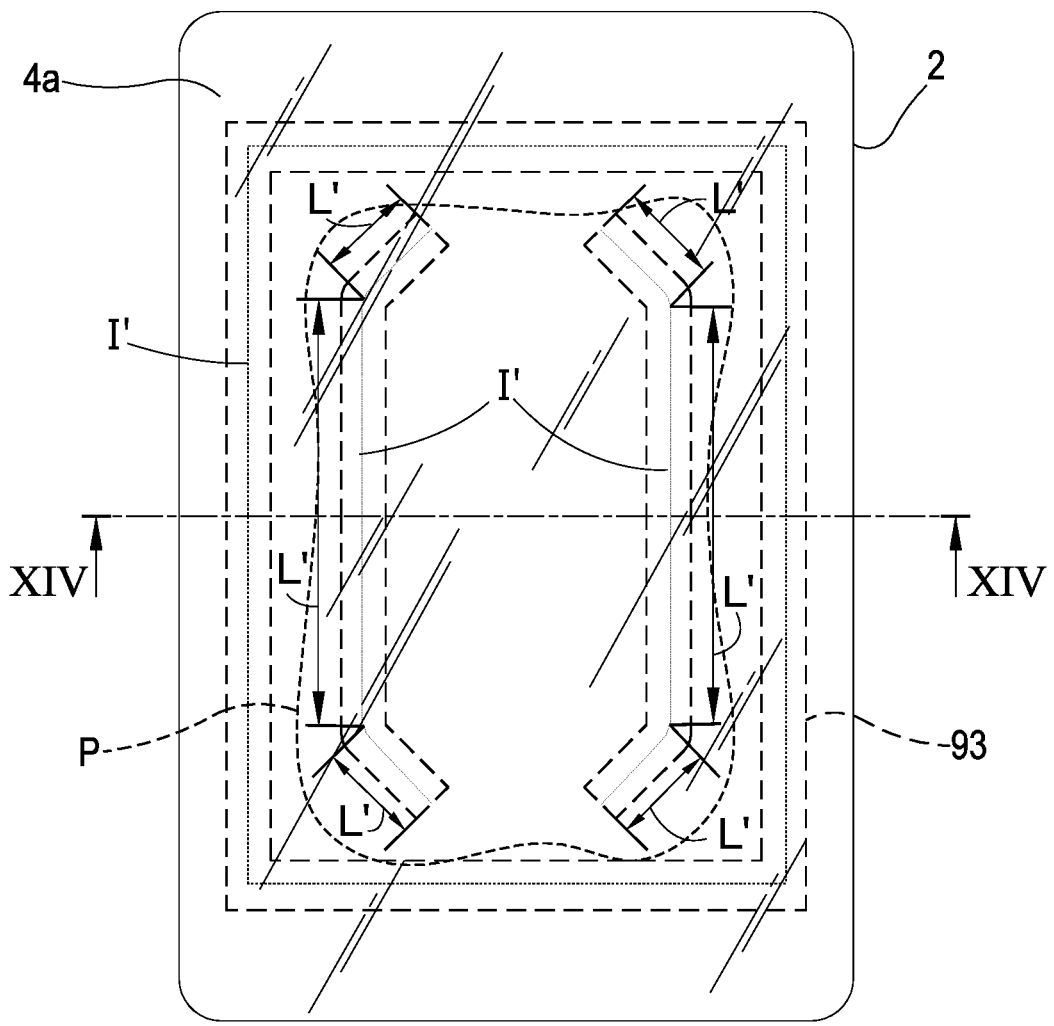
FIG. 13 a top view of a vacuum skin package obtainable with the apparatus of the preceding figures.
Figure 14:
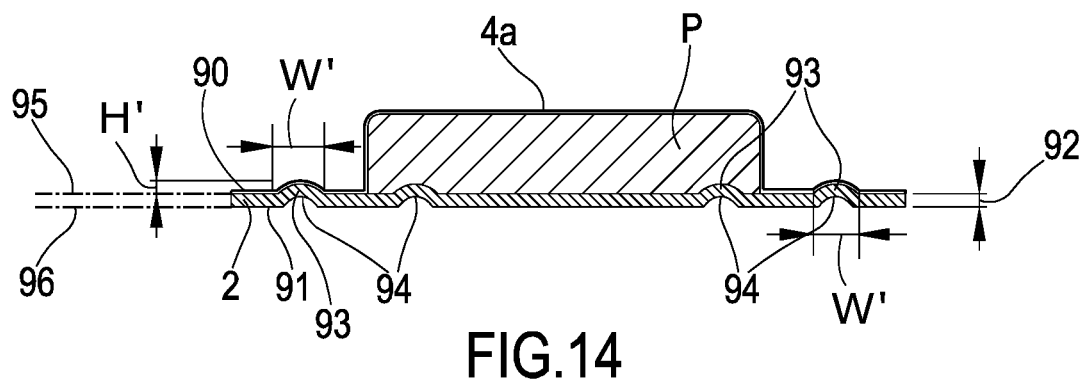
FIG. 14 is a cross section according to plane XIV-XIV of FIG. 13.
Figure 17:
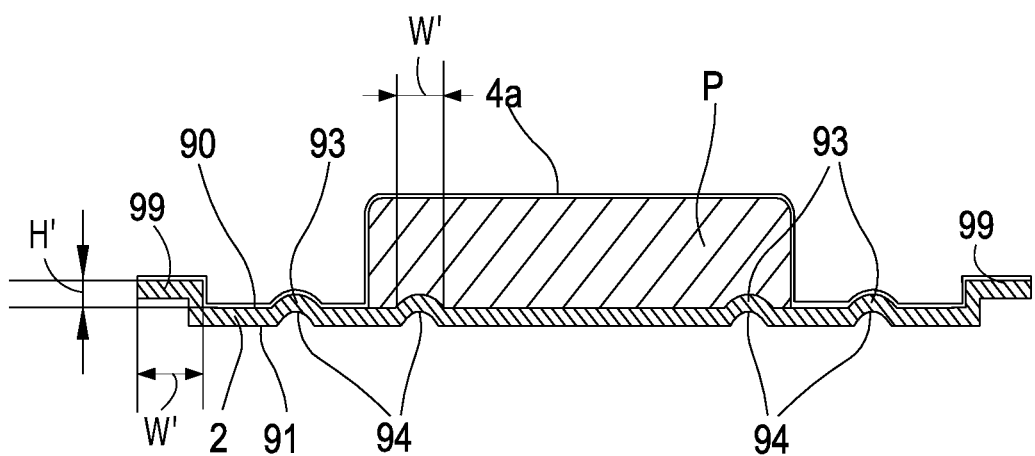
FIG. 17 is a cross sectional view of a vacuum skin package obtainable with the apparatus of the preceding figures using in particular the base equipment of FIG. 16A.
Figure 18:
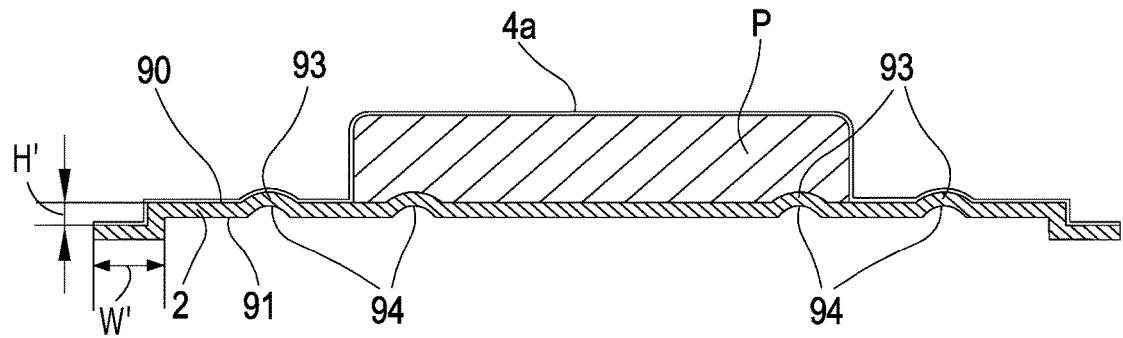
FIG. 18 is a cross sectional view of a vacuum skin package obtainable with the apparatus of the preceding figures using in particular the base equipment of FIG. 16B.

The elongated structures, which as it has been just described may either be pre-formed or formed during the packaging process, may include at least one of a continuous ridge or rib 93 and corresponding indent 94 extending across the support 2 (FIGS. 13 and 14). Alternatively or in addition (see FIGS. 17 and 18), the elongated structures may include a continuous flange 99 extending at the periphery of the respective support 2 above said top plane 95 or below said top plane 95. In FIGS. 17 and 18 it is shown a support 2 with both ridges or ribs 93 with corresponding underlying indents 94 and a continuous flange 99 extending above or below top plane 95 located at the periphery of the support and forming a sort of peripheral flange almost at the same level of the rest of the support and just lightly staggered up or down compared to the top plane 95.

Each of the one or more elongated structures extends along a respective ideal median line (i) of preferential development and has:
 a length (L') measured along ideal line (I') of preferential development,
 a height (H') relative to the top plane 95, measured perpendicular to the top plane 95,
 a width (W') measured parallel to the top plane and perpendicular to the ideal line of preferential development.

In a currently preferred solution the length (L') of each elongated structure is at least 2 times greater than the respective width (W'), with the width (W') being at least 50% of the respective height (H'), and with the height (H') being less than 10 mm.

In accordance with one aspect, the elongated structures 93 or 99 may have length (L') which is 5 times or more than the width (W') of the same elongated structure and width (W') which is equal to or greater than the height (H') of the same elongated structure: this is for example the case in the embodiments of FIGS. 13, 14, 17 and 18 which all show highly elongated structures with reduced height comprised between 0.1 and 5 mm and width (W') comprised between 0.1 and 30 mm.

In the examples of FIGS. 13 and 14 ridges or ribs 93 protrude from top surface 90, and one or more elongated indents 94 on the bottom surface extending along and in correspondence of the elongated ridges; the top and bottom surfaces of the sheet body, with the exclusion of said elongated ridges and of said elongated indents, are flat and extend along respective parallel top and bottom planes 95 and 96. In analogy with the size of the elongated features, also the elongated ridges 93 on the supports protrude above the top plane 95 and may have height H' comprised between 0.1 and 2.0 mm. Furthermore, in one aspect each one of the elongated ridges presents, in cross section, a rounded top contour.

As for the features on the receiving areas 8 of the lower tool, also the elongated structures on the support (see example of FIG. 13) may include one or more first elongated structures 93, i.e. elongated ridges or ribs, extending along a first direction, one or more second elongated structures 93, i.e., elongated ribs or ridges, extending along a second direction at an angle to the first direction, and optionally third elongated structures extending transversally to both the first and second elongated features. In FIGS. 13 and 14, the elongated structures 93 comprise also at least one elongated structure of annular shape extending in correspondence of a peripheral band which encircles a central zone of the support 2. Furthermore, in FIGS. 13 and 14, the support 2 includes non-parallel continuous ribs, optionally non-parallel continuous straight ribs, extending at least across the support 2 above the top plane 95; in this case the support is substantially in the form of a rectangle and some of the non-parallel continuous ribs has a length which is at least 75%, optionally at least 90%, the length of the longest side of said rectangle.

In FIGS. 17 and 18, the one or more elongated structures 99 comprise (in addition to or in place of optional ribs similar to those of FIGS. 13 and 14) a continuous flange extending at the periphery of the support 2 above or below top plane 95 at a height H' which is comprised between 0.1 and 10 mm, optionally between 0.1 and 5 mm. The continuous flange completely surrounds a central portion of the support 2 and has an annular shape, optionally a substantially rectangular frame shape. This flange of annular shape is immediately adjacent to the peripheral border of the central portion of the support 2 and presents an upper surface extending on a respective lying plane staggered from the top plane of the support and located below or above and parallel to top plane 95 of the support 2, with a distance between said lying plane of the upper surface of the flange and the top plane being equal to said height (H'). Going in further detail, in the examples of FIGS. 17 and 18, the elongated structures comprise:
 a number of continuous ribs 93 extending across the support 2 above top plane 95 and having a width (W') comprised between 0.1 and 10 mm; and
 a continuous flange 99 extending at the periphery of the respective support 2 below or above said top plane 95 (in the example of FIG. 18 the continuous flange 99 is not only below the top plane 95, but also below bottom plane 96); the continuous flange surrounds the entire support and has a closed annular having width (W') comprised between 5 mm and 30 mm.

In general, in order to endure a substantially uniform mechanical behavior of the support the elongated structures 93 and 99 described above are symmetrically positioned with respect to an axis of symmetry of the support 2.

In all examples described above the height H' of the elongated structures 93 or 99, in particular the height of the continuous rib or ribs and/or the height of the continuous flange, is below 5 times the thickness the support 2, optionally below 3 times the thickness of the support 2: in other words the elongated structures confer higher out of plane stiffness to the support which however preserves an overall planar shape.

Control Unit of Apparatus 1

The apparatus according to the invention has of at least one control unit 100.

The control unit 100 (schematically represented in the appended figures) is at least connected to the actuators and or motors acting on the conveyor, the lower tool, the upper tool, the store and the product loading station. The control unit is also connected to the pump and valves which are part of the vacuum arrangement and of the auxiliary vacuum arrangement. The control unit is configured or programmed to execute the steps describe above. The control unit may comprise a digital processor (CPU) with memory (or memories), an analogical type circuit, or a combination of one or more digital processing units with one or more analogical processing circuits. In the present description and in the claims it is indicated that the control unit is "configured" or "programmed" to execute certain steps: this may be achieved in practice by any means which allow configuring or programming the control unit. For instance, in case of a control unit comprising one or more CPUs, one or more programs are stored in an appropriate memory: the program or programs containing instructions which, when executed by the control unit, cause the control unit to execute the steps described and/or claimed in connection with the control unit. Alternatively, if the control unit is of an analogical type, then the circuitry of the control unit is designed to include circuitry configured, in use, to process electric signals such as to execute the control unit steps herein disclosed.

The Packaging Process

Aspects of the invention concern a process of packaging a product P arranged on a support 2. The process uses the apparatus according to any one of the appended claims. In an aspect, the packaging process uses one of the apparatuses described above. In accordance with a general aspect, the packaging process comprises the following steps:

supplying a plastic film 4 from the film supply assembly 3;

placing at least one product loaded support 2 on the respective receiving area 8 of the base equipment 6;

holding a film portion 4a of said plastic film 4 above the at least one support loaded product 2 positioned in the respective receiving area 8;

heat sealing the at least one film portion 4a of said plastic film to the at least one respective of said product loaded supports 2.

The above process steps may be coordinated by the control unit 100 acting on appropriate actuators and/or motors as described above in connection with the apparatus of any one of FIGS. 1-8.

In accordance with a possible variant detail, the packaging process may be a vacuum skin packaging process and comprise the following steps:

positioning the upper and lower tools 10, 11 in the first operating condition;

with the upper and lower tools 10, 11 in the first operating condition, sucking gas through the suction apertures 18 and hold the film portion 4a against or close to the upper tool active surface, heating at least part of the film portion 4a held by the upper tool 10, placing at least one product loaded support 2 located on the respective receiving area 8 of the base equipment 6 below said film portion 4a held by the upper tool 10, moving the upper and lower tools 10, 11 to the second operating condition;

with the upper and lower tools 10, 11 in the second operating condition, extracting gas present between the at least one film portion 4a and the underlying product loaded support 2, re-venting of gas through the suction apertures 18 and releasing the film portion 4a, allowing the film portion to drape down and heat seal to the product loaded support forming at least one vacuum skin packaged product (P).

During said step of re-venting, the one or more supports 2 are pressed against the respective receiving area 8, such that the elongated features 82 engage the indents 94 present on the bottom surface of the supports (in case the supports have pre-formed ridges and indents) or such that the peripheral flange 99 rests (see FIG. 19) peripheral lower tool 11a while the central part of the support 2 rests on the central lower tool 11b. Alternatively, formation on the support of elongated structures, such as ribs or ridges 93 and corresponding indents 94 or such as the peripheral flange 99, in any case counter-shaped to the elongated features 82 present on the receiving area is caused to take place during the packaging cycle during re-venting and extraction of gas when basically the top film 4a is adhered to the support and the support is pressed against the bottom tool top surface.

The Vacuum Skin Package

The apparatuses and processes described above may be suitable for making a vacuum skin package hosting at least one product, as described in this section and as claimed in any one of the attached claims relating to a 'vacuum skin package'. An example of this type of package is shown in FIGS. 13 and 14. This package may be obtained using any one of supports 2 of the type above described. One or more products P are loaded on the support, and the film 4 is draped over the product(s) and welded to an inner surface portion of the support not covered by the product(s). The support presents:

a sheet body having a top surface 90, a bottom surface 91 and a thickness 92, one or more preformed elongated ridges 93 protruding from top surface, and one or more preformed elongated indents 94 on the bottom surface extending along and in correspondence of the elongated ridges.

The top and bottom surfaces 91 and 92 of the sheet body, with the exclusion of said elongated ridges and of said elongated indents, are flat and extend along respective parallel top and bottom planes 95, 96. In an aspect, at least 75%, optionally 85% of the top surface of the sheet body is flat.

Each one of the elongated ridges 93 protrudes above said top plane 95 to define a ridge height comprised between 0.1 and 2.0 mm, and may present, in cross section, a rounded top contour.

In general, the plastic film heat sealed to the product loaded support and the product loaded support are made from respective different materials: in particular the plastic film and the support may be such that, at atmospheric pressure and at least in an interval between 20° C. and 100° C., the plastic film has a coefficient of linear expansion per Celsius degree in at least one direction which is greater than the coefficient of linear expansion per Celsius degree in the same direction of the underlying support; thus when the plastic film material cools following the end of the packaging cycle the different coefficient of thermal expansion would tend to contract the plastic film more than the underlying support, with an associated consequence that the underlying support, absent the elongated ridges 93 and elongated indents 94 obtained with the apparatus and process of the invention, would tend to bend. Instead, thanks to the invention the each support 2 has ridges and indents 93 and 94 which remain in the packed product also at the end of the packaging cycle and which prevent or minimize out of plane deflections or bending on the part of the support.

Going into further structural details, the support presents a thickness 92 comprised between 0.10 mm and 2.00 mm and is formed by one of the following:
- a sheet of paper,
- a sheet of cardboard,
- a multilayered structure comprising at least one layer of paper and at least one layer of cardboard,
- a multilayered structure comprising a plurality of layers of paper,
- a multilayered structure comprising a plurality of layers of cardboard,
- a plastic sheet,
- a multilayered structure comprising a plurality of layers of plastic,
- a multilayered structure comprising at least one continuous inner layer of paper sandwiched between at least one continuous top liner of plastic and at least one continuous bottom liner of plastic,
- a multilayered structure comprising at least one continuous inner layer of cardboard sandwiched between at least one continuous top liner of plastic and at least one continuous bottom liner of plastic.

On the other hand, the plastic film 4 presents a thickness comprised between 20 microns and 200 microns.

In case the process is a vacuum skin packaging process, the film materials described herein above in the respective section of the present description may be used. The plastic film used for vacuum skin packaging may have a free shrink at 160° C., in both the longitudinal and transversal directions (ASTM D2732), which is greater than 3% and optionally less than 20%, preferably less than 15%, even more preferably than 10%.

As already mentioned, the plastic film 4 used herein significantly contract when cooled. This may be measured by a parameter called residual shrink tension, which is determined as follows.

Specimens of the plastic film (2.54 cm×14.0 cm, of which 10 cm are free for testing) are cut in the longitudinal (LD) and transverse (TD) directions of the film and clamped between two jaws, one of which is connected to a load cell. The two jaws keep the specimen in the center of a channel into which an impeller blows hot or cold air and two thermocouples measure the temperature. The thermocouples are positioned as close as possible (less than 3 mm) to the specimen and in the middle of the same. The signals issued by the thermocouples (which is representative of the testing temperature) and by the load cell (which is representative of the force) are sent to a computer which is programmed to record and elaborate these signals.

The measurement process provides that the impeller starts blowing hot air and the force released by the sample is recorded. The temperature is increased from 25° C. to 180° C., at a rate of about 2.5° C./second by blowing hot air and then decreased from 180° C. to 5° C. at a rate of 1.5° C./second by blowing cold air. Three specimens are measured for each film in both longitudinal (LD) and transverse (TD) directions. The average results are then collected. Then, the residual shrink tension at 5° C. (which is expressed in Kg/cm$^2$) is calculated by dividing the force value in Kg measured by the load cell at 5° C., by the specimen width (expressed in cm) and by the specimen average thickness (expressed in cm). The residual shrink tension may be calculated in an analogous manner at various temperatures (e.g., at 100, 90, 80, 70, 60, 50, 40, 30, 20, 10, 5 Celsius degrees). The residual shrink tension, in both the longitudinal and transversal directions, determined with the above procedure for the plastic films used herein is, at 5° C., at least 3 times, optionally at least 5 times, greater than the residual shrink tension at 100° C. In other words, when cooled down the films used herein significantly contract both in the longitudinal and in the transverse directions, thereby causing the residual shrink tension to significantly increase as temperature goes down.

In the case where the supports present through holes, then during gas extraction at least part of said extracted gas passes through one or more through holes present in the support. Note that in the examples of FIGS. 5 and 6, each support presents through holes and the conveyor comprises a conveyor belt having gas passages and/or porous portions and during gas extraction the extracted gas passes through one or more through holes present in the support and through one or more passages or gas permeable portions of the conveyor belt.

VARIANTS

While the invention has been described in connection with what is presently considered to be the most practical and preferred embodiments, it is to be understood that the invention is not to be limited to the disclosed embodiments, but on the contrary, is intended to cover various modifications and equivalent arrangements included within the scope of the appended claims. In particular, although the invention finds optimal application in vacuum skin packaging processes and apparatus, it is not excluded that the principles of the invention may also be used in any packaging process or apparatus where a film is heat bonded to a support and then cooled, thereby contracting and evidencing the potential drawbacks of bending or undulating the underlying support.

The invention claimed is:

1. An apparatus for packaging a product arranged on a support comprising:
   a film supply assembly configured to supply a plastic film;
   a base equipment having an upper side defining a receiving area, the receiving area being configured to receive a product loaded support;
   an upper tool operative above the base equipment and configured to hold a film portion of said plastic film above the product loaded support positioned in the receiving area, the upper tool and the base equipment being configured to cooperate for heat sealing the film portion to the product loaded support,
   wherein the receiving area comprises:
      a flat portion extending on a predetermined positioning plane and defining a majority of the surface of the receiving area, and
      an elongated feature having an active surface extending out of the positioning plane of the flat portion,
   wherein the elongated feature includes at least one of:
      a continuous rib extending across the receiving area above the positioning plane, or
      a continuous body extending at a periphery of the receiving area above or below said positioning plane, and
   wherein the elongated feature extends along a line of preferential development and has:
      a length measured along the line of preferential development, a height relative to the positioning plane, measured perpendicular to the positioning plane, a width measured parallel to the positioning plane and perpendicular to the line of preferential development, wherein the length is at least 2 times greater than the width, the width is at least 50% of the height, and the height is less than 10 mm.

2. The apparatus according claim 1, wherein the length of the elongated feature is 5 times or more than the width of the elongated feature.

3. The apparatus of claim 2, wherein the width of the elongated feature is equal to or greater than the height of the elongated feature.

4. The apparatus of claim 3, wherein the height of the elongated feature is between 0.1 and 5 mm.

5. The apparatus of claim 3, wherein the width of the elongated feature is between 0.1 and 30 mm.

6. The apparatus of claim 1, wherein the elongated feature is one of a plurality of elongated features symmetrically positioned with respect to an axis of symmetry of the receiving area.

7. The apparatus of claim 6, wherein the plurality of elongated features comprises:
a first elongated feature extending along a first direction, and
a second elongated feature extending along a second direction at an angle to the first direction.

8. The apparatus of claim 1, wherein the elongated feature extends in correspondence of a peripheral band which encircles a central zone of the receiving area.

9. The apparatus of claim 1,
wherein the elongated feature includes a plurality of non-parallel continuous ribs extending at least across the receiving area above the positioning plane; and
wherein either (1) the receiving area is substantially in the form of a rectangle and each one of the non-parallel continuous ribs has a length which is at least 75% of a length of a longest side of said rectangle, or (2) the receiving area is substantially in the form of an ellipse and each one of the non-parallel continuous ribs has a length which is at least 75% of a length of a longest axis of said ellipse.

10. The apparatus of claim 1, wherein the elongated feature comprises a continuous body extending at the periphery of the receiving area above or below said positioning plane at a height which is between 0.1 and 10 mm.

11. The apparatus of claim 10, wherein the flat portion of the receiving area is completely surrounded by the continuous body which has an annular shape.

12. The apparatus of claim 11, wherein the continuous body of annular shape is immediately adjacent to the peripheral border of the flat portion and presents an upper surface extending on a respective lying plane staggered from the positioning plane of the flat portion.

13. The apparatus of claim 11, wherein the continuous body upper surface extends on a lying plane which is located below and parallel to the positioning plane of the flat portion, wherein a distance between said positioning plane of the flat portion and said lying plane of the upper surface of the continuous body is equal to said height.

14. The apparatus of claim 11, wherein the continuous body upper surface extends on a lying plane which is located above and parallel to the positioning plane of the flat portion, wherein a distance between said positioning plane of the flat portion and said lying plane of the upper surface of the continuous body is equal to said height.

15. The apparatus of claim 1, wherein the continuous body and the flat portion of the receiving area are relatively movable with respect to each other according to a direction perpendicular to said positioning plane for adjusting said height.

16. The apparatus of claim 1, wherein the elongated feature is defined by a respective elongated element removably engaged to the upper side of the base equipment.

17. The apparatus of claim 1, wherein the elongated feature presents, in cross section, a rounded top contour.

18. The apparatus of claim 1, wherein the base equipment comprises a lower tool cooperating with the upper tool in correspondence of a packaging station of the apparatus, and wherein the upper tool and the lower tool are relatively displaceable between:
a first operating condition, where the upper tool is sufficiently spaced from the lower tool to allow positioning of the product loaded support below said film portion held by the upper tool, and
a second operating condition, where the upper tool is approached relative to the lower tool and is configured to heat seal the film portion to the underlying product loaded support.

19. The apparatus of claim 18, wherein the apparatus includes:
a vacuum arrangement configured to remove air from a volume between said at least one film portion and the product loaded support located in the packaging station;
suction apertures distributed on an active surface of the upper tool and connected with one of said vacuum arrangement or an auxiliary vacuum arrangement;
a heater configured to heat at least a portion of the upper tool active surface;
a control unit configured to control the upper and lower tools, the heater and the one of the vacuum arrangement or the auxiliary vacuum arrangement,
wherein the control unit is configured to:
cause the upper and lower tools to position in the first operating condition,
command one of the vacuum arrangement or the auxiliary vacuum arrangement to cause suction of gas through said suction apertures while the upper and lower tools are in the first operating condition and hold the film portion against or close to said active surface,
command the heater to cause heating of at least part of the film portion held by the upper tool while the upper and lower tools are in the first operating condition,
cause the upper and lower tools to move to the second operating condition,
command the vacuum arrangement to extract gas present between the at least one film portion and the underlying product loaded support while the upper and lower tools are in the second operating condition, and
command one of the vacuum arrangement or the auxiliary vacuum arrangement to cause re-venting with expulsion of gas through the suction apertures while the upper and lower tools are in the second operating condition to release the film portion from the upper tool active surface and drape down of the film portion onto the product loaded support, the film portion heat sealing to an upper surface of the support not covered by the product forming at least one vacuum skin packaged product.

20. The apparatus of claim 19, wherein:
the receiving areas are defined on an upper side of the lower tool which is directly facing the upper tool.

21. The apparatus of claim 18, wherein the apparatus includes:
- a conveyor configured to displace the product loaded support along a predetermined path at least from a product loading station to said packaging station;
- a vacuum arrangement configured to remove air at least from a volume between said film portion and the product loaded support located in the packaging station;
- suction apertures distributed on an active surface of the upper tool and connected with one of said vacuum arrangement or an auxiliary vacuum arrangement;
- a heater configured to heat at least a portion of the upper tool active surface;
- a control unit configured to control the conveyor, the upper and lower tools, the heater, and the one of the vacuum arrangement or the auxiliary vacuum arrangement, wherein the control unit is configured to:
- cause the upper and lower tools to position in the first operating condition,
- command the one of the vacuum arrangement or the auxiliary vacuum arrangement to cause suction of gas through said suction apertures while the upper and lower tools are in the first operating condition and hold the film portion against or close to said active surface,
- command the heater to cause heating of at least part of the film portion held by the upper tool while the upper and lower tools are in the first operating condition,
- cause the conveyor to position said product loaded support on the receiving area of the base equipment below said film portion held by the upper tool while the upper and lower tools are in the first operating condition,
- cause the upper and lower tools to move to the second operating condition,
- command the vacuum arrangement to extract gas present between the film portion and the underlying product loaded support while the upper and lower tools are in the second operating condition,
- command the one of the vacuum arrangement or the auxiliary vacuum arrangement to cause re-venting with expulsion of gas through the suction apertures while the upper and lower tools are in the second operating condition to release the film portion from the upper tool active surface and drape down of the film portion onto the product loaded support, the film portion heat sealing to an upper surface of the support not covered by the product forming at least one vacuum skin packaged product.

22. The apparatus according to of claim 21, wherein:
said receiving area is defined on an upper side of the conveyor which is configured to cross the packaging station above the lower tool.

23. A process of packaging a product arranged on a support using the apparatus of claim 1, wherein the process comprises:
- supplying a plastic film from the film supply assembly;
- placing a product loaded support on the receiving area of the base equipment;
- holding a film portion of said plastic film above the product loaded support positioned in the receiving area;
- heat sealing the film portion of said plastic film to the product loaded support.

* * * * *